United States Patent
Fujii

(10) Patent No.: US 9,397,725 B2
(45) Date of Patent: Jul. 19, 2016

(54) RECEPTION CIRCUIT AND COMMUNICATION SYSTEM

(71) Applicant: Kabushiki Kaisha Toshiba, Minato-Ku, Tokyo (JP)

(72) Inventor: Shinsuke Fujii, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/482,204

(22) Filed: Sep. 10, 2014

(65) Prior Publication Data

US 2015/0311932 A1    Oct. 29, 2015

(30) Foreign Application Priority Data

Apr. 24, 2014    (JP) .................................. 2014-090445

(51) Int. Cl.
*H03H 7/30* (2006.01)
*H04B 3/00* (2006.01)

(52) U.S. Cl.
CPC ........................................ *H04B 3/00* (2013.01)

(58) Field of Classification Search
CPC ................... H04L 25/03019; H04L 25/03038; H03F 3/45
USPC ........... 375/233, 229; 708/322, 323; 327/156, 327/234; 323/207, 283
See application file for complete search history.

(56) References Cited

U.S. PATENT DOCUMENTS

| 7,508,892 B2 | 3/2009 | Kibune et al. |
| 8,209,370 B2 * | 6/2012 | Lablans .......................... 708/493 |
| 8,446,942 B2 | 5/2013 | Hasegawa et al. |
| 2007/0025436 A1 | 2/2007 | Shumarayev et al. |
| 2010/0253307 A1 * | 10/2010 | Chen et al. .................... 323/283 |
| 2012/0025919 A1 * | 2/2012 | Huynh ............................. 331/34 |
| 2012/0249095 A1 * | 10/2012 | Zhao et al. ..................... 323/234 |
| 2013/0063108 A1 * | 3/2013 | Nishida et al. ................ 323/271 |
| 2013/0241509 A1 * | 9/2013 | Chung et al. .................. 323/282 |

FOREIGN PATENT DOCUMENTS

| JP | 2005303607 | 10/2005 |
| JP | 2007037114 | 2/2007 |
| WO | 2009113462 | 9/2009 |

OTHER PUBLICATIONS

Masum Hossain, "A 14-Gb/s 32 mW AC Coupled Received in 90-nm CMOS" 2007 Symposium on V/LSI Circuits Digest of Technical Papers.
Taiwanese Office Action issued on Nov. 18, 2015 in corresponding Taiwanese Appliation No. 103127755, along with Englsh translation and search report thereof.

* cited by examiner

*Primary Examiner* — Khai Tran
(74) *Attorney, Agent, or Firm* — White & Case LLP

(57) ABSTRACT

According to an embodiment, a reception circuit receives a reception signal according to a signal transmitted from a transmission electrode through a reception electrode capacitively coupled to the transmission electrode. The reception circuit includes an adder, a hysteresis circuit, a shift register and a feedback signal generator. The adder is configured to add one or more feedback signals to the reception signal. The hysteresis circuit has hysteresis in input and output characteristics, and is configured to output output data according to an output signal of the adder. The shift register is configured to sequentially shift the output data of the hysteresis circuit. The feedback signal generator is configured to generate the feedback signal according to each output data of the shift register.

18 Claims, 19 Drawing Sheets

RECEPTION CIRCUIT AND COMMUNICATION SYSTEM

CROSS REFERENCE TO RELATED APPLICATION

This application is based upon and claims the benefit of priority from the prior Japanese Patent Application No. 2014-090445 filed on Apr. 24, 2014 in Japan, the entire contents of which are incorporated herein by reference.

FIELD

Embodiments described herein relate generally to a reception circuit and a communication system.

BACKGROUND

A communication system including a transmission circuit to transmit a signal from a transmission electrode and a reception circuit to receive a signal through a reception electrode capacitively coupled to the transmission electrode has been known. The reception circuit restores a transmitted original data pattern from the received signal. At this time, the original data pattern cannot be accurately restored due to an influence of inter-symbol interference (hereinafter, also referred to as ISI).

DETAILED DESCRIPTION

According to an embodiment, a reception circuit receives a reception signal according to a signal transmitted from a transmission electrode through a reception electrode capacitively coupled to the transmission electrode. The reception circuit includes an adder, a hysteresis circuit, a shift register and a feedback signal generator. The adder is configured to add one or more feedback signals to the reception signal. The hysteresis circuit has hysteresis in input and output characteristics, and is configured to output output data according to an output signal of the adder. The shift register is configured to sequentially shift the output data of the hysteresis circuit. The feedback signal generator is configured to generate the feedback signal according to each output data of the shift register.

Embodiments will now be explained with reference to the accompanying drawings.

Before embodiments of the present invention are described, comparative examples known by the inventor will be described.

Figure 15A:
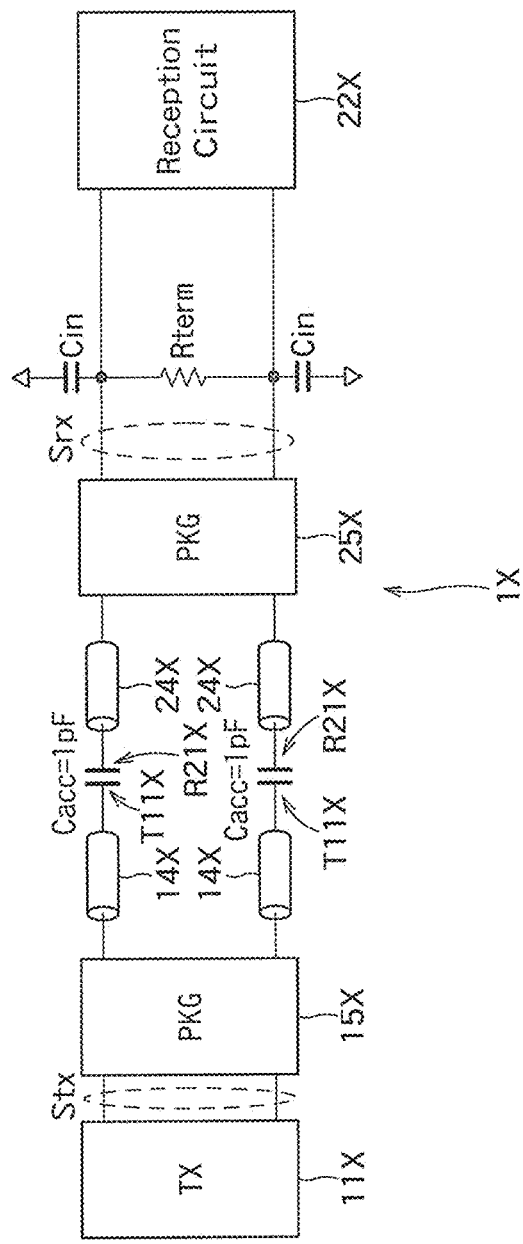
FIG. 15A is a block diagram illustrating a schematic configuration of a communication system according to a comparative example.
Figure 15B:
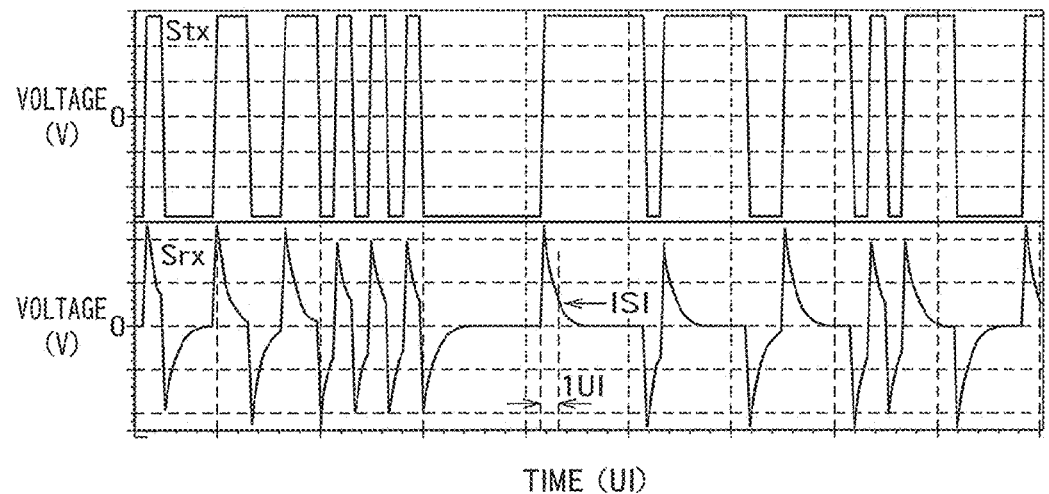
FIG. 15B is a waveform diagram illustrating a transmission signal and a reception signal of the communication system of FIG. 15A.
Figure 15C:
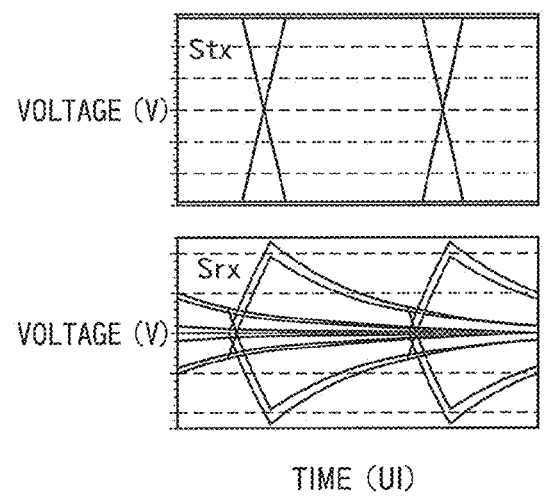
FIG. 15C is a diagram illustrating eye patterns of the transmission signal and the reception signal of the communication system of FIG. 15A.

FIG. 15A is a block diagram illustrating a schematic configuration of a communication system 1X according to a comparative example. FIG. 15B is a waveform diagram illustrating a transmission signal Stx and a reception signal Srx of the communication system 1X of FIG. 15A. FIG. 15C is a diagram illustrating eye patterns of the transmission signal Stx and the reception signal Srx of the communication system 1X of FIG. 15A.

As illustrated in FIG. 15A, a transmission circuit 11X outputs a differential transmission signal Stx and the transmission signal Stx is transmitted from a pair of transmission electrodes T11X through a package 15X and wiring lines (channels) 14X. The package 15X includes parasitic element components (a resistor, an inductor, and a capacitor) between the transmission circuit 11X and the wiring lines 14X. The wiring line 14X includes an inductor.

A pair of reception electrodes R21X is capacitively coupled to the transmission electrodes T11X. Here, capacitance of each of coupling capacitors Cacc is defined as 1 pF.

Thereby, signals are transmitted from the transmission electrodes T11X to the reception electrodes R21X through the coupling capacitors Cacc.

A reception circuit 22X receives differential reception signals Srx from the reception electrodes R21X through wiring lines 24X and the package 25X. A terminating resistor Rterm is connected between input terminals of the reception circuit 22X. Parasitic capacitors Cin exist at both ends of the terminating resistor Rterm, respectively.

As illustrated in FIG. 15B, a voltage of the transmission signal Stx changes between a negative voltage and a positive voltage, according to transmission data. The transmission signal Stx represents data "0" when the voltage of the transmission signal is the negative voltage and represents data "1" when the voltage of the transmission signal is the positive voltage.

Due to the coupling capacitor Cacc mainly, the voltage of the reception signal Srx changes from 0 V to the positive voltage at timing when the voltage of the transmission signal Stx changes from the negative voltage to the positive voltage. Then, the voltage of the reception signal Srx gradually returns to 0 V. In addition, the voltage of the reception signal Srx changes from 0 V to the negative voltage at timing when the voltage of the transmission signal Stx changes from the positive voltage to the negative voltage. Then, the voltage of the reception signal Srx gradually returns to 0 V.

Therefore, as illustrated in FIG. 15C, an opening of the eye pattern of the reception signal Srx becomes smaller than an opening of the eye pattern of the transmission signal Stx.

In communication using the capacitive coupling, the reception circuit 22X needs to satisfy the following performance (1) to (5).

(1) Original transmission data is restored from the reception signal Srx pulsed for a high-pass characteristic by the capacitive coupling.

(2) Inter-symbol interference occurring for a high-band attenuation characteristic by the wiring lines (channels) 14X and 24X is decreased.

(3) Inter-symbol interference occurred by an influence of a high-pass filter including the coupling capacitor Cacc and the terminating resistor Rterm is decreased.

(4) Reflection (not illustrated in the drawings) generated for impedance discontinuity by capacitive coupling is decreased.

(5) An amplitude variation of the transmission signal Stx is absorbed.

Figure 16:
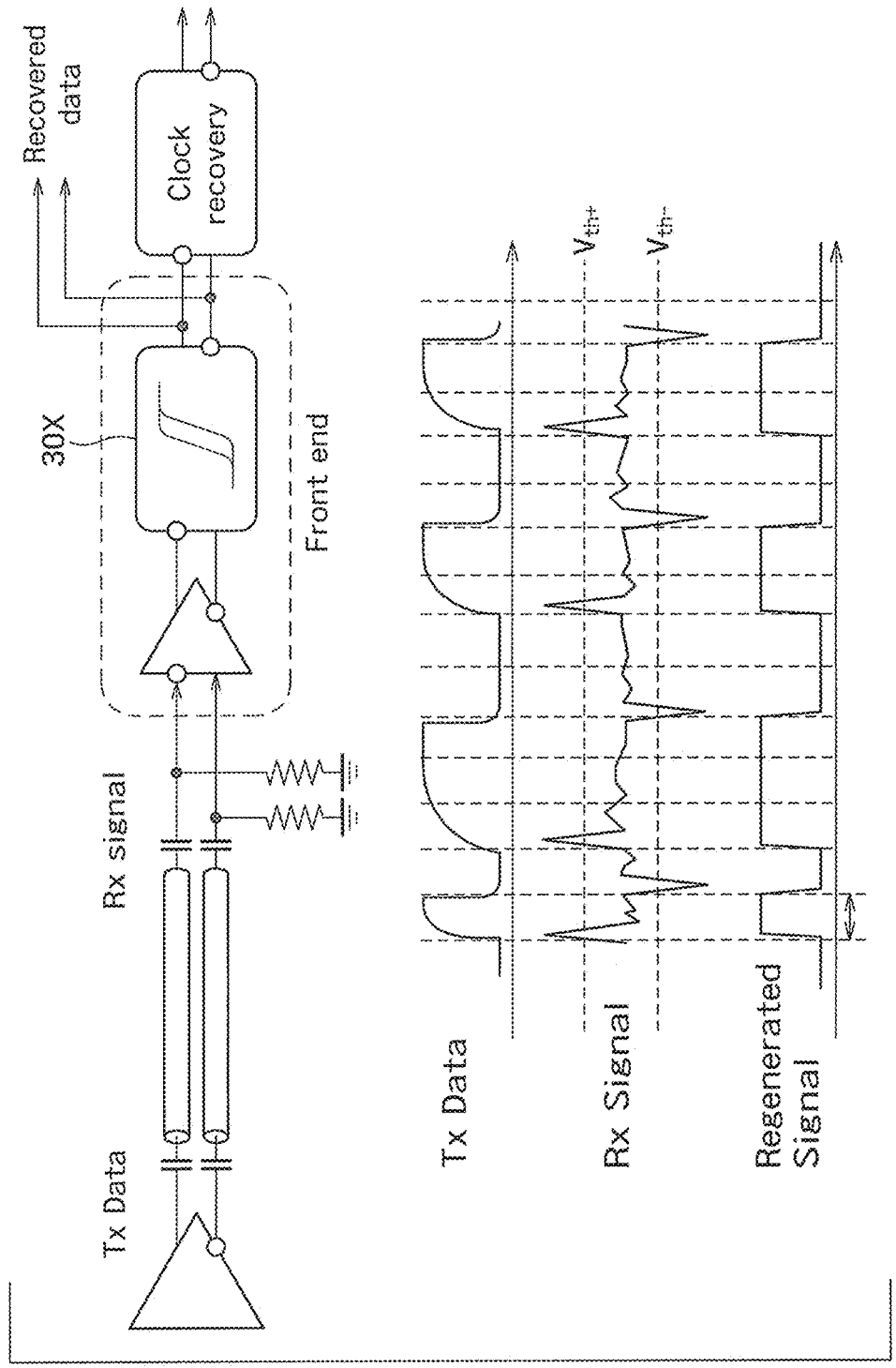
FIG. 16 is a block diagram illustrating a schematic configuration of a reception circuit according to the comparative example.

A reception circuit according to a comparative example illustrated in FIG. 16 restores original transmission data (Tx Data) from a pulsed reception signal (Rx Signal), using a hysteresis circuit 30X having hysteresis in input and output characteristics. In this configuration, the performance (1) can be satisfied. However, the other performance cannot be satisfied.

Figure 17:
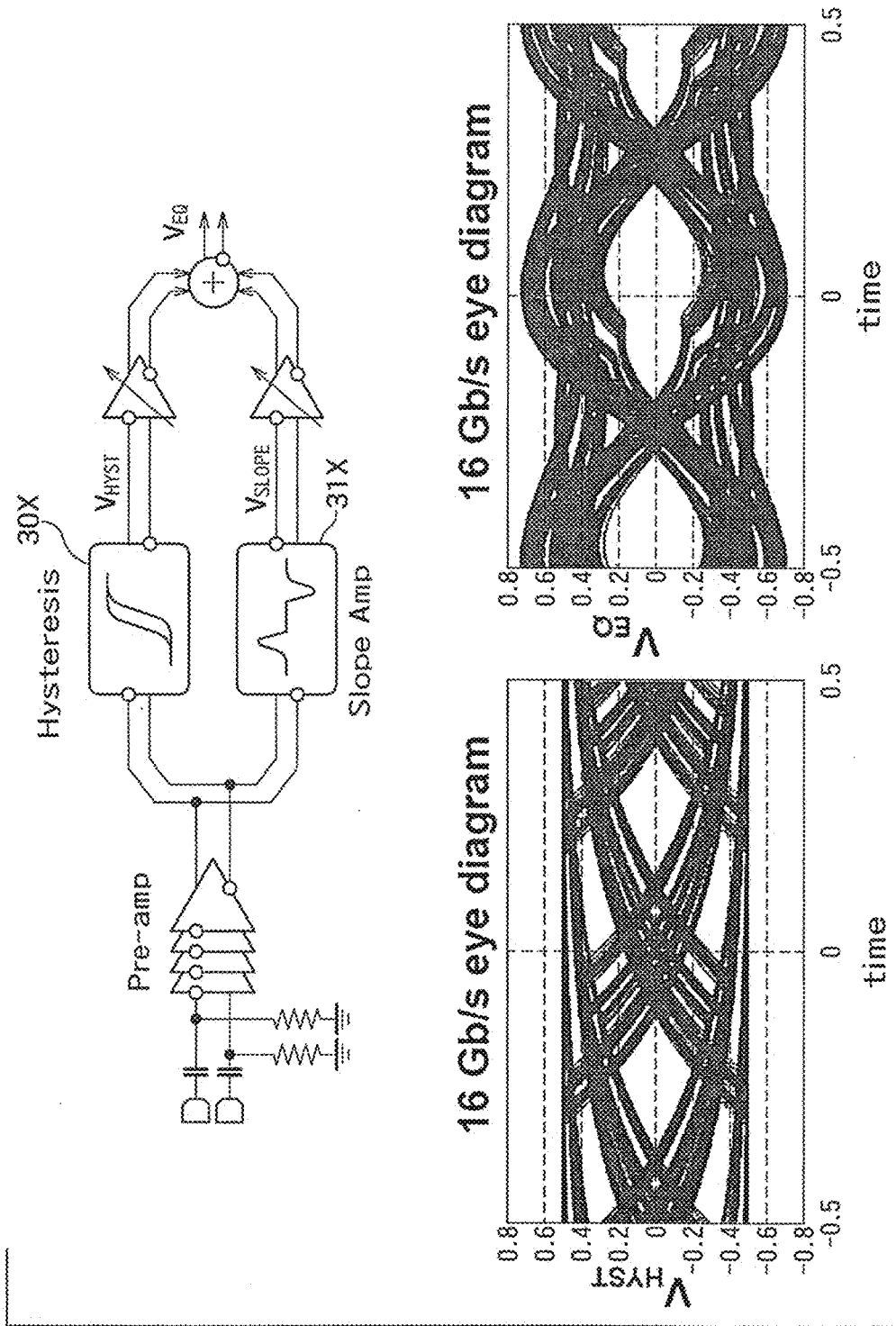
FIG. 17 is a block diagram illustrating a schematic configuration of a reception circuit according to another comparative example.

In addition, a reception circuit according to another comparative example illustrated in FIG. 17 includes a hysteresis circuit 30X and a buffer circuit 31X and performs weighting addition of an output signal $V_{HYST}$ of the hysteresis circuit 30X and an output signal $V_{SLOPE}$ of the buffer circuit 31X. Because the output signal $V_{SLOPE}$ of the buffer circuit 31X is equivalent to a reception signal, the output signal $V_{SLOPE}$ is almost equivalent to a high-band component of a transmission signal. Therefore, a high-band boost characteristic is obtained and the performance (1) and (2) can be satisfied. However, the other performance cannot be satisfied.

As such, in the reception circuits according to the comparative examples, because the performance (1) to (5) cannot be satisfied, an original data pattern cannot be accurately restored.

Hereinafter, embodiments of the present invention will be described with reference to the drawings. These embodiments are not intended to limit the present invention.

First Embodiment

Figure 1:
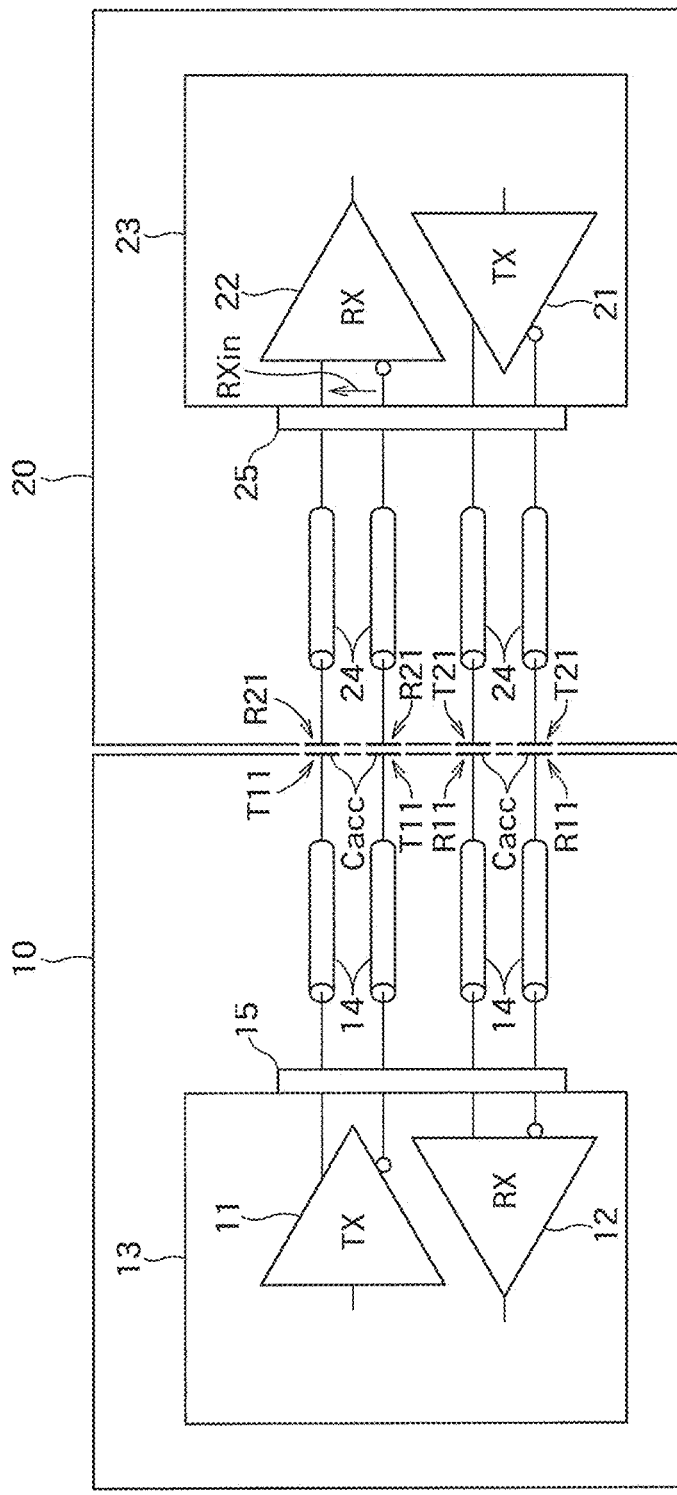
FIG. 1 is a block diagram illustrating a schematic configuration of a communication system according to a first embodiment.

FIG. 1 is a block diagram illustrating a schematic configuration of a communication system 1 according to a first embodiment. As illustrated in FIG. 1, the communication system 1 includes a first communication device 10 and a second communication device 20. The first communication device 10 and the second communication device 20 perform contactless communication.

The first communication device 10 has a pair of transmission electrodes T11, a pair of reception electrodes R11, a transmission circuit 11, and a reception circuit 12. The transmission circuit 11 and the reception circuit 12 may be configured as a semiconductor integrated circuit 13.

The second communication device 20 has a pair of transmission electrodes T21, a pair of reception electrodes R21, a transmission circuit 21, and a reception circuit 22. The transmission circuit 21 and the reception circuit 22 may be configured as a semiconductor integrated circuit 23.

The first communication device 10 and the second communication device 20 are arranged to come close to each other, so that the transmission electrode T11 and the reception electrode R21 come close to each other and the reception electrode R11 and the transmission electrode T21 come close to each other, when communication is performed. Each of a distance of the transmission electrode T11 and the reception electrode R21 and a distance of the reception electrode R11 and the transmission electrode T21 is, for example, several mm. By the arrangement described above, the transmission electrode T11 and the reception electrode R21 are capacitively coupled to each other, the reception electrode R11 and the transmission electrode T21 are capacitively coupled to each other, and capacitance of each of coupling capacitors Cacc is, for example, several-hundred fF to several pF.

The transmission circuit 11 transmits a differential signal according to transmission data TXdata from the transmission electrode T11, through a package 15 and wiring lines (channels) 14. Amplitude of the transmitted differential signal may change by several-hundred mVp-p, according to an environment change. Hereinafter, the differential signal will be described. However, a single-phase (single-ended) signal may be used.

The reception circuit 22 receives a differential reception signal RXin according to the transmitted differential signal, through the reception electrode R21 capacitively coupled to the transmission electrode T11, wiring lines (channels) 24, and a package 25.

The transmission circuit 21 and the reception circuit 12 are operated in the same way as the above case. For this reason, the reception circuit 22 will be described hereinafter.

Figure 2:
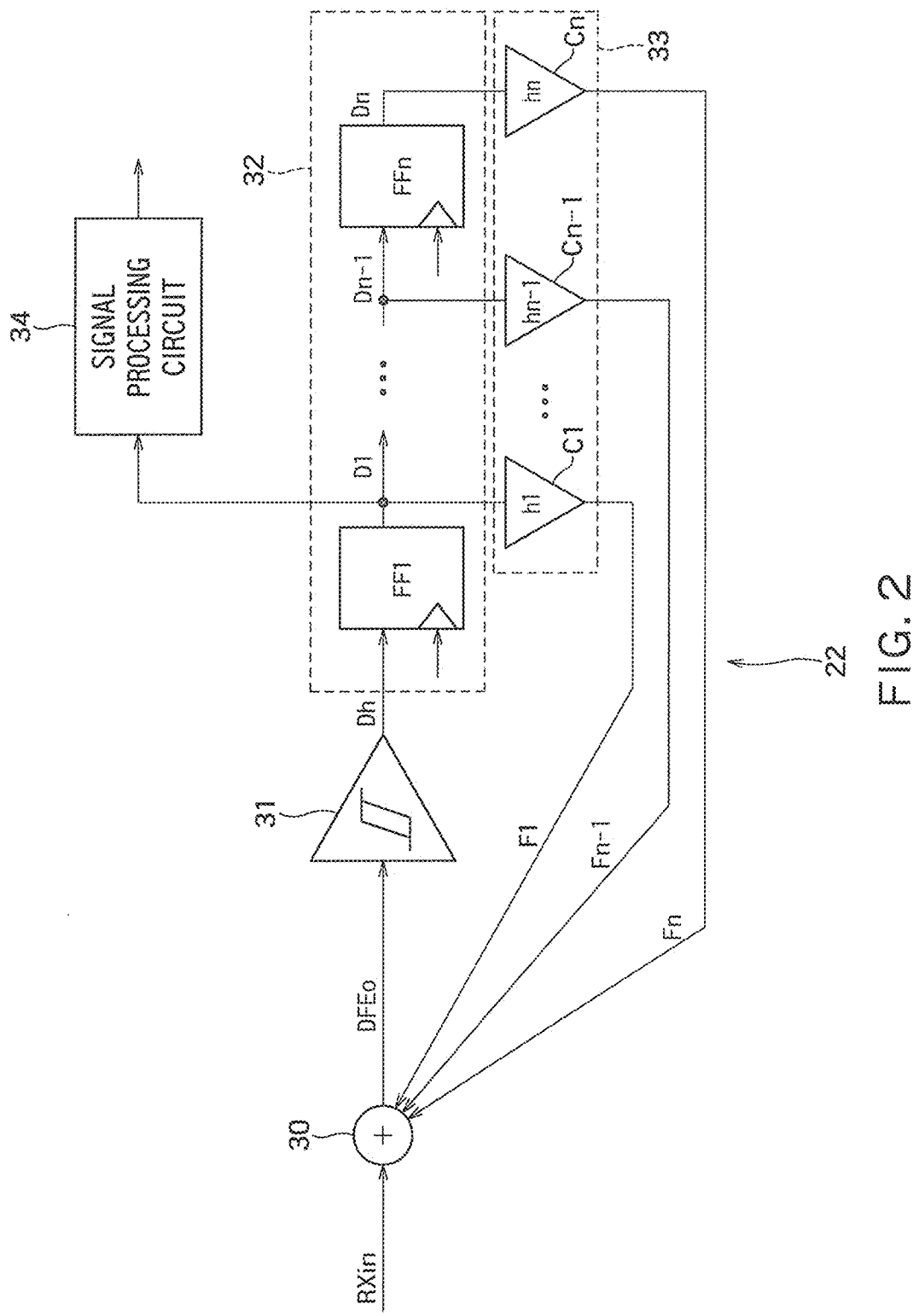
FIG. 2 is a block diagram illustrating a schematic configuration of a reception circuit of FIG. 1.

FIG. 2 is a block diagram illustrating a schematic configuration of the reception circuit 22 of FIG. 1. As illustrated in FIG. 2, the reception circuit 22 includes an adder 30, a hysteresis circuit 31, a shift register 32, a feedback signal generator 33, and a signal processing circuit 34. The adder 30, the shift register 32, and the feedback signal generator 33 configures a decision feedback equalizer (DFE).

The adder 30 adds n (n is a positive integer) (one or more) feedback signals F1 to Fn to the differential reception signal RXin.

The hysteresis circuit 31 has hysteresis in input and output characteristics and outputs output data Dh according to an output signal DFEo of the adder 30. Here, the hysteresis circuit 31 outputs output data Dh of a high level ("1") when a voltage of the output signal DFEo is equal to or more than a first threshold voltage Vth1 and outputs output data Dh of a low level ("0") when the voltage of the output signal DFEo is equal to or less than a negative second threshold voltage −Vth2. That is, the hysteresis circuit 31 functions as a hysteresis comparator that compares the output signal DFEo of the adder 30 with the first threshold voltage Vth1 and the second threshold voltage −Vth2 and outputs output data Dh according to a comparison result.

The shift register 32 sequentially shifts the output data Dh of the hysteresis circuit 31 in synchronization with a clock and outputs n output data D1 to Dn. Output data Di (i is an integer of 1 to n) is equal to data obtained by shifting the output data Dh of the hysteresis circuit 31 $i$ times. The shift register 32 has n flip-flops FF1 to FFn and a flip-flop FFi outputs the output data Di. In FIG. 2, the flip-flops FF1 and FFn are illustrated and the other flip-flops are not illustrated.

The feedback signal generator 33 generates the corresponding feedback signals F1 to Fn, according to each output data D1 to Dn of the shift register 32. Specifically, the feedback signal generator 33 has n arithmetic units c1 to cn. Each arithmetic unit ci outputs a feedback signal Fi based on a tap coefficient (equalization coefficient) hi, according to the output data Di of the shift register 32. For example, the arithmetic unit ci outputs the feedback signal F1 (=h1) based on the tap coefficient h1, when the output data D1 of the shift register 32 is "0", and outputs the feedback signal F1 (=−h1) based on the tap coefficient h1, when the output data D1 of the shift register 32 is "1". That is, an absolute value of each feedback signal F1 is equal to the tap coefficient hi and the polarity thereof is determined according to the output data Di. In FIG. 2, the arithmetic units c1, cn−1, and cn are illustrated and the other arithmetic units are not illustrated.

The feedback signal generator 33 may determine the tap coefficients h1 to hn by a least mean square (LMS) algorithm used by a general decision feedback equalizer, may use the tap coefficients h1 to hn of fixed values stored in advance, and may use the tap coefficients h1 to hn supplied from the outside.

The signal processing circuit 34 executes signal processing using the output data D1 of the shift register 32, that is, the output data D1 of the flip-flop FF1.

Figure 3:
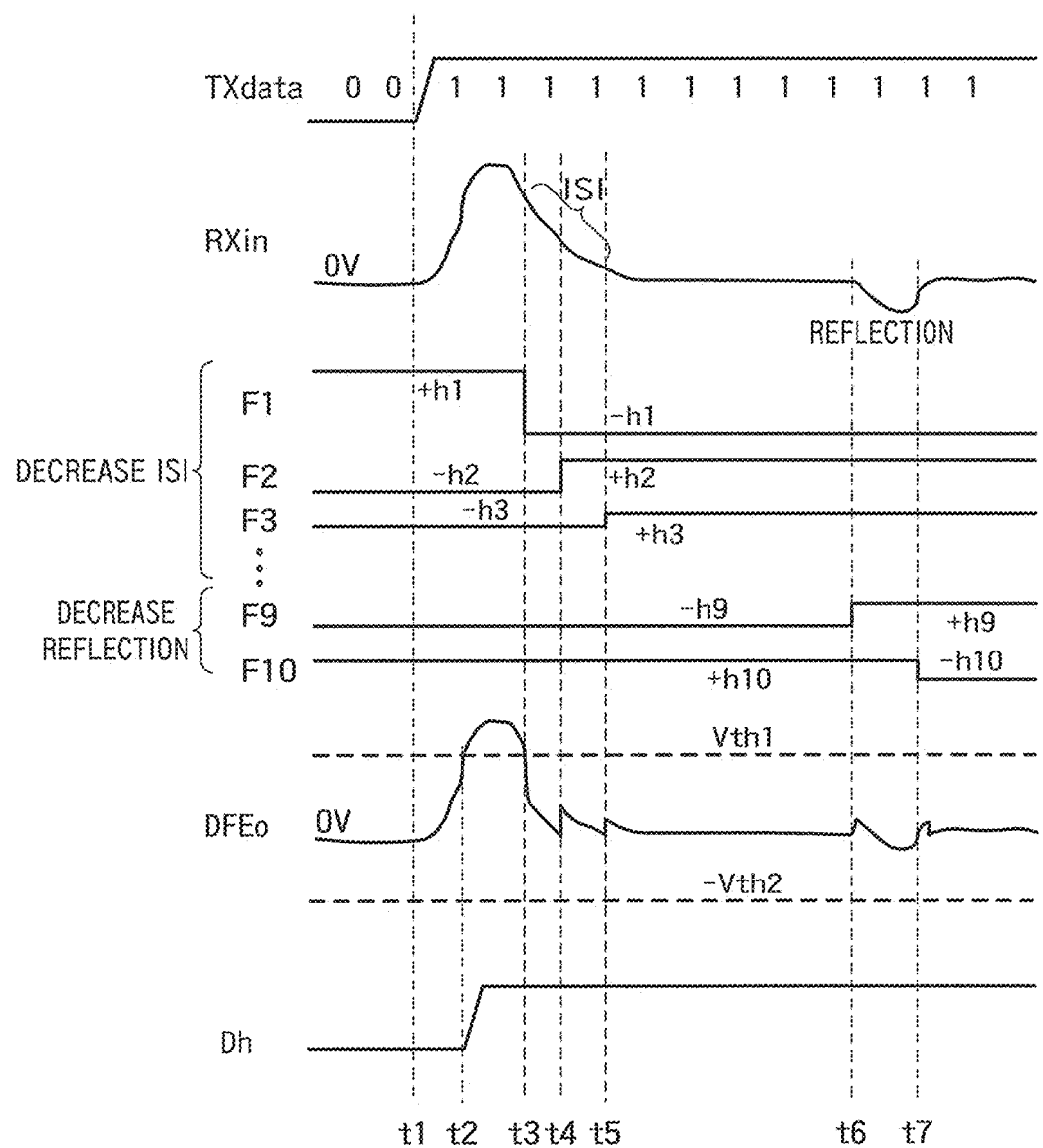
FIG. 3 is a waveform diagram of each unit of the reception circuit of FIG. 1.

FIG. 3 is a waveform diagram of each unit of the reception circuit 22 of FIG. 1. In FIG. 3, an example of the case in which n is 10 and transmission data TXdata transmitted from the transmission circuit 11 is "0" to a time t1 and then is "1" is illustrated.

Because the voltage of the reception signal RXin is about 0 V and a sum of the voltages of the feedback signals F1 to F10 is also about 0 V to the time t1, the voltage of the output signal DFEo is also about 0 V.

At the time t1, if the transmission data TXdata changes to "1", the voltage of the reception signal RXin increases by capacitive coupling. Thereby, the voltage of the output signal DFEo also increases and is more than the first threshold voltage Vth1 at a time t2. Therefore, at a time t2, output data Dh changes from "0" to "1".

The shift register 32 sequentially shifts the output data Dh (="1"). Therefore, because the output data D1 changes from "0" to "1" at a next time t3, a value of the feedback signal F1 changes from a value +h1 to a value −h1. Thereby, a value of the output signal DFEo becomes a value obtained by adding twice the value −h1 to the reception signal RXin. That is, the value of the output signal DFEo is smaller than a value of the reception signal RXin.

At about a time t3, the reception signal RXin has inter-symbol interference and the voltage thereof becomes a positive voltage. Meanwhile, inter-symbol interference of the output signal DFEo decreases and the voltage of the output signal approximates 0 V.

At a next time t4, because output data D2 changes from "0" to "1", a value of a feedback signal F2 changes from a value −h2 to a value +h2. At this time, the output data D1 does not change from "1". Thereby, the value of the output signal DFEo becomes a value obtained by adding twice the value −h1 and twice the value +h2 to the reception signal RXin. Therefore, inter-symbol interference of the output signal DFEo decreases and the voltage of the output signal approximates 0 V.

At a next time t5 and subsequent times, the same operation is executed. In addition, because output data D9 changes from "0" to "1" at a time t6, a value of a feedback signal F9 changes from a value −h9 to a value +h9. Thereby, the value of the output signal DFEo becomes a value obtained by adding a value added immediately before the time t6 and twice the value +h9 to the reception signal RXin.

The voltage of the reception signal RXin becomes a negative voltage by an influence of reflection, from the time t6 to a time t7. Meanwhile, the influence of the reflection on the output signal DFEo is decreased by the feedback signal F9 and the voltage of the output signal approximates 0 V.

At the next time t7, a value of a feedback signal F10 changes from a value +h10 to a value −h10. Thereby, the value of the output signal DFEo becomes a value obtained by adding a value added immediately before the time t7 and twice the value −h10 to the reception signal RXin. At this time, a sum of the voltages of the feedback signals F1 to F10 is about 0 V. Therefore, the voltage of the output signal DFEo returns to about 0 V after the time t7.

That is, the feedback signals F1 to F8 decrease the inter-symbol interference and the feedback signals F9 and F10 decrease the influence of the reflection.

As described above, according to this embodiment, the output signal DFEo of the adder 30 is converted into the output data Dh by the hysteresis circuit 31 having the hysteresis in the input and output characteristics. In addition, feedback signals F1 to Fn according to the past output data D1 to Dn from the hysteresis circuit 31 are added to the current reception signal RXin. Thereby, because it is possible to perform waveform equalization of the reception signal RXin received using the capacitive coupling, the inter-symbol interference and the influence of the reception can be decreased. That is, the performance (1) to (4) described in the comparative examples can be satisfied.

Therefore, the original data pattern can be more accurately restored from the reception signal RXin.

Second Embodiment

A second embodiment is different from the first embodiment in that a variable gain amplifier 40, etc., is included.

Figure 4:
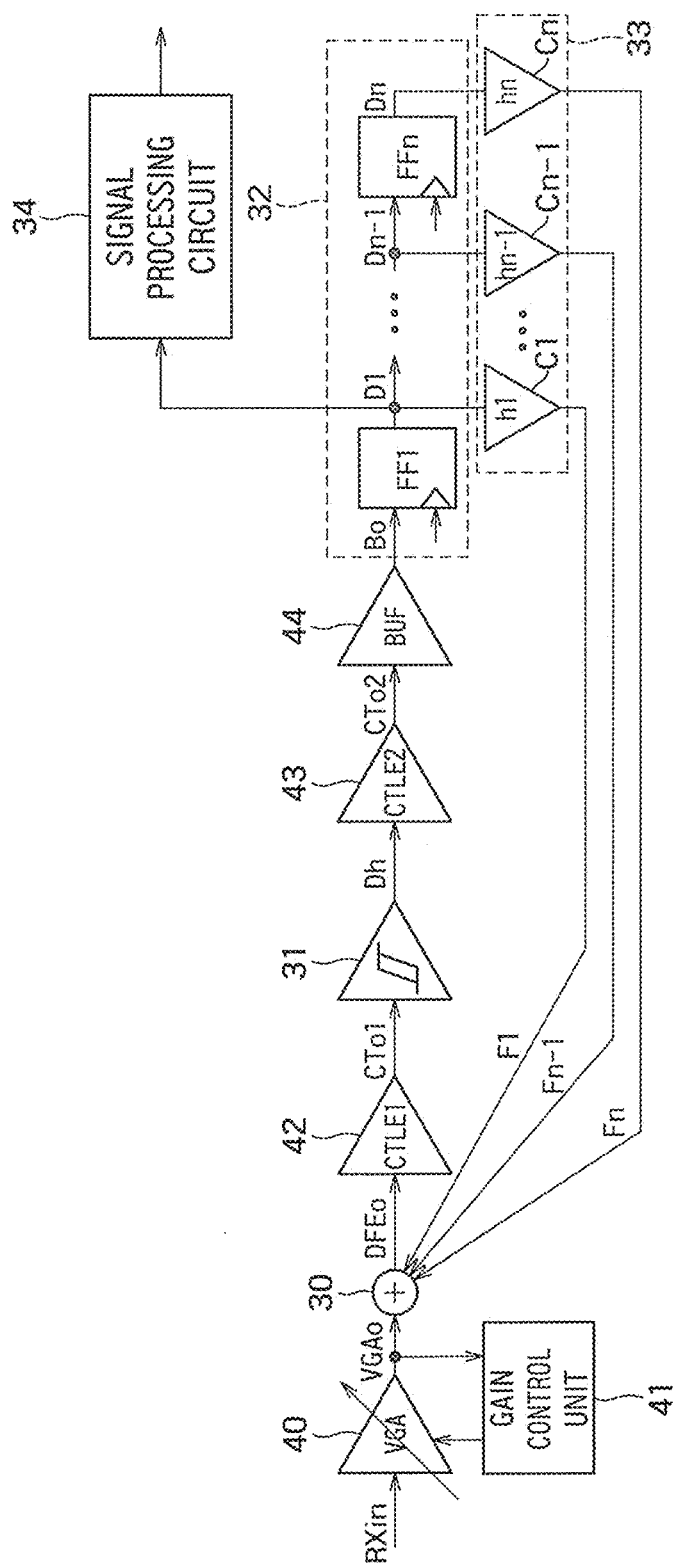
FIG. 4 is a block diagram illustrating a schematic configuration of a reception circuit according to a second embodiment.

FIG. 4 is a block diagram illustrating a schematic configuration of a reception circuit 22A according to a second embodiment. In FIG. 4, components common to those in FIG. 1 are denoted with the same reference numerals and a difference is mainly described hereinafter.

As illustrated in FIG. 4, the reception circuit 22A includes a variable gain amplifier (VGA) 40, a gain control unit 41, a first continuous time linear equalizer 1 (CTLE1) 42, a second continuous time linear equalizer 2 (CTLE2) 43, and a buffer 44 in addition to the configuration according to the first embodiment.

The variable gain amplifier 40 is connected between a reception electrode R21 and an adder 30, amplifies a reception signal RXin with variable gain, and outputs the amplified reception signal RXin (that is, a signal VGAo) to the adder 30.

The gain control unit 41 controls gain of the variable gain amplifier 40, so that amplitude of the amplified reception signal RXin (signal VGAo) approximates a constant value.

The first continuous time linear equalizer 42 is connected between the adder 30 and a hysteresis circuit 31, amplifies (boosts) a frequency component of a first high frequency band included in an output signal DFEo of the adder 30 that is a circuit of a front stage, and outputs an obtained signal CTo1 to the hysteresis circuit 31 that is a circuit of a rear stage. The frequency component of the first high frequency band is a frequency component according to ISI (precursor ISI and postcursor ISI) of the reception signal RXin due to a low-pass filter characteristic between the reception electrode R21 and the adder 30 by wiring lines (channels) 24.

The second continuous time linear equalizer 43 is connected between the hysteresis circuit 31 and a shift register 32, attenuates a frequency component of a second high frequency band included in output data Dh of the hysteresis circuit 31 that is a circuit of a front stage, and outputs an obtained signal CTo2. The frequency component of the second high frequency band is a frequency component according to ISI (precursor ISI and postcursor ISI) of the reception signal RXin due to a high-pass filter characteristic by capacitive coupling. The first high-frequency band is different from the second high-frequency band.

The buffer 44 is connected between the second continuous time linear equalizer 43 and the shift register 32, amplifies the output signal CTo2 of the second continuous time linear equalizer 43, and supplies an obtained signal Bo to the shift register 32. Thereby, a flip-flip FF1 of the shift register 32 rarely executes an erroneous operation.

Figure 5A:
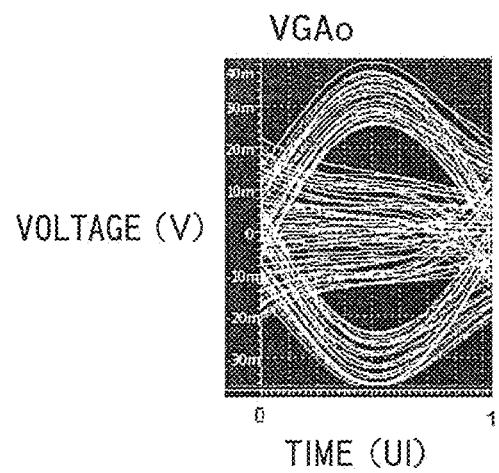
FIG. 5A is a diagram illustrating an eye pattern of an output signal of a variable gain amplifier.
Figure 5B:
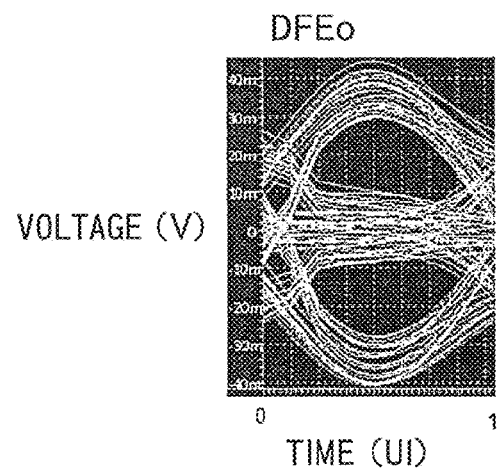
FIG. 5B is a diagram illustrating an eye pattern of an output signal of an adder.
Figure 5C:
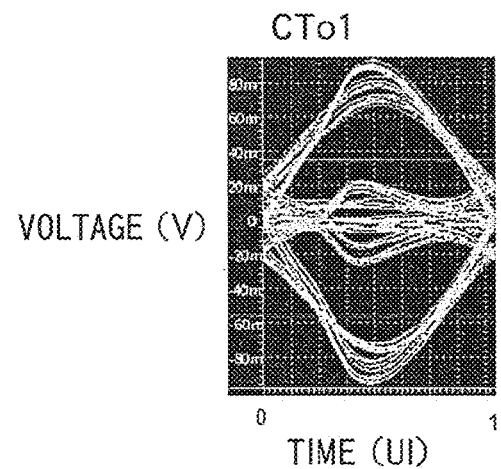
FIG. 5C is a diagram illustrating an eye pattern of an output signal of a first continuous time linear equalizer.
Figure 5D:
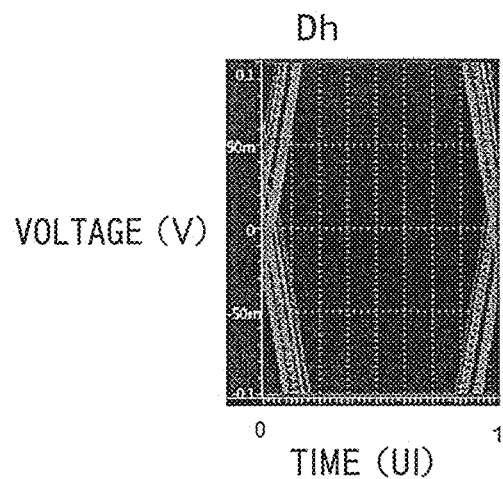
FIG. 5D is a diagram illustrating an eye pattern of an output data of a hysteresis circuit.
Figure 5E:
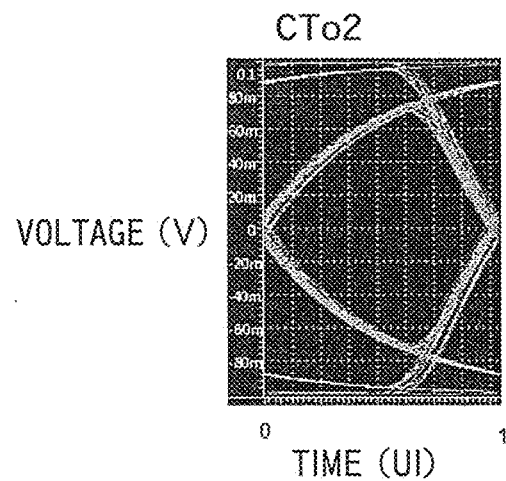
FIG. 5E is a diagram illustrating an eye pattern of an output signal of a second continuous time linear equalizer.

FIGS. 5A to 5E are diagrams illustrating an eye pattern of each unit of the reception circuit 22A of FIG. 4. FIG. 5A illustrates an eye pattern of the output signal VGAo of the variable gain amplifier 40, FIG. 5B illustrates an eye pattern of the output signal DFEo of the adder 30, and FIG. 5C illustrates an eye pattern of the output signal CTo1 of the first continuous time linear equalizer 42. FIG. 5D illustrates an eye pattern of the output data Dh of the hysteresis circuit 31 and FIG. 5E illustrates an eye pattern of the output signal CTo2 of the second continuous time linear equalizer 43.

In FIG. 5B, the inter-symbol interference and the reflection are decreased by a function of a decision feedback equalizer and an opening of the eye pattern increases, as compared with FIG. 5A.

In FIG. 5C, the precursor ISI and the postcursor ISI by the wiring lines (channels) 24 are decreased by boosting of the first high frequency band by the first continuous time linear equalizer 42 and the opening of the eye pattern increases, as compared with FIG. 5B.

In FIG. 5D, an original data pattern is restored by the hysteresis circuit 31.

In FIG. 5E, the precursor ISI and the postcursor ISI by the capacitive coupling are decreased by attenuation of the second high frequency band by the second continuous time linear equalizer 43, as compared with FIG. 5D.

As described above, according to this embodiment, the gain of the variable gain amplifier 40 is controlled so that the amplitude of the amplified reception signal RXin (signal VGAo) approximates a constant value. Therefore, even though amplitude of a signal transmitted from a transmission circuit 11 changes and the amplitude of the reception signal RXin changes, data can be accurately restored. In addition, the same effect as the first embodiment is obtained. That is, the performance (1) to (5) described in the comparative examples can be satisfied.

Meanwhile, when the variable gain amplifier is not provided as in the first embodiment, it is necessary to provide a margin to a first threshold voltage Vth1 and a second threshold voltage −Vth2 of the hysteresis circuit 31 to correspond to the amplitude change of the reception signal RXin. For this reason, setting of the threshold voltages is complicated. In addition, the tap coefficients h1 to hn need to be changed according to the amplitude of the reception signal RXin and a process is complicated.

According to this embodiment, because the frequency component of the first high frequency band according to the precursor ISI and the postcursor ISI is amplified, rising and falling of a signal can be made to become faster and the precursor ISI and the postcursor ISI occurring due to the loss-pass filter characteristic by the wiring lines (channels) 24 can be decreased. Thereby, jitter can be decreased and an opening of an eye pattern can be increased. Therefore, data can be restored more accurately.

In addition, because the frequency component of the second high frequency band according to the precursor ISI and the postcursor ISI is attenuated, the precursor ISI and the postcursor ISI occurring due to the high-pass filter characteristic by the capacitive coupling can be decreased. Thereby, the jitter can be further decreased and the opening of the eye pattern can be further increased. Therefore, the data can be restored more accurately.

The precursor ISI cannot be decreased in the first embodiment.

At least one of the variable gain amplifier 40 and the gain control unit 41, the first continuous time linear equalizer 42, the second continuous time linear equalizer 43, and the buffer 44 may be provided according to a required characteristic. In addition, the first continuous time linear equalizer 42, the hysteresis circuit 31, the second continuous time linear equalizer 43, and the buffer 44 may be connected in any order, between the adder 30 and the shift register 32.

In addition, the gain control unit 41 may refer to the output signal DFEo of the adder 30 or the output signal CTo1 of the first continuous time linear equalizer 42 and may control gain so that the amplitude of the amplified reception signal RXin approximates a constant value.

Third Embodiment

A third embodiment is different from the second embodiment in a connection position of a first continuous time linear equalizer 42.

Figure 6:
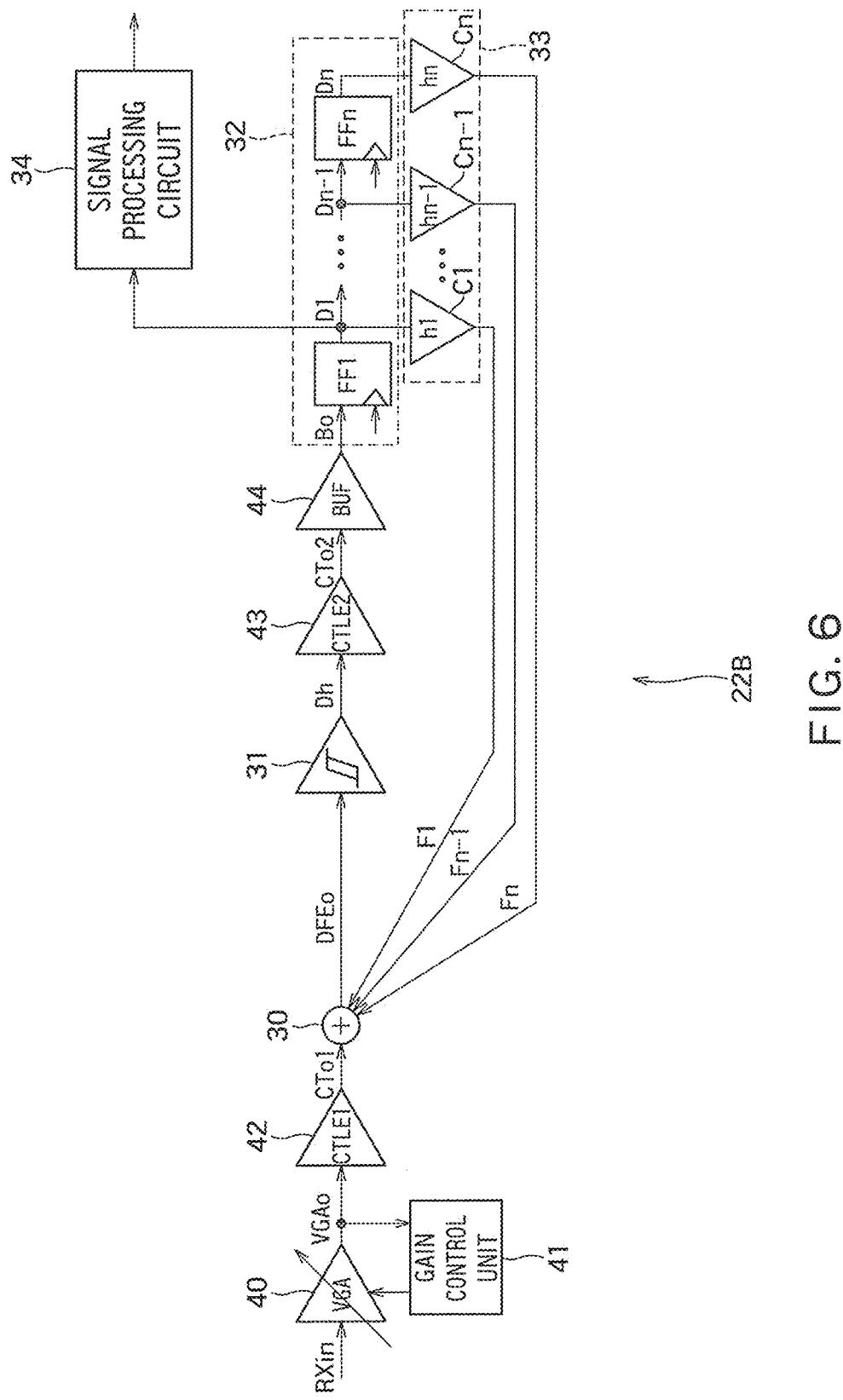
FIG. 6 is a block diagram illustrating a schematic configuration of a reception circuit according to a third embodiment.

FIG. 6 is a block diagram illustrating a schematic configuration of a reception circuit 22B according to the third embodiment. In FIG. 6, components common to those in FIG. 4 are denoted with the same reference numerals and a difference is mainly described hereinafter. In the reception circuit 22B, the first continuous time linear equalizer 42 is connected between a variable gain amplifier 40 and an adder 30.

By such a configuration, the same effect as the second embodiment can be obtained.

Fourth Embodiment

A fourth embodiment is different from the third embodiment in that a hysteresis voltage of a hysteresis circuit 31C is controlled.

Figure 7:
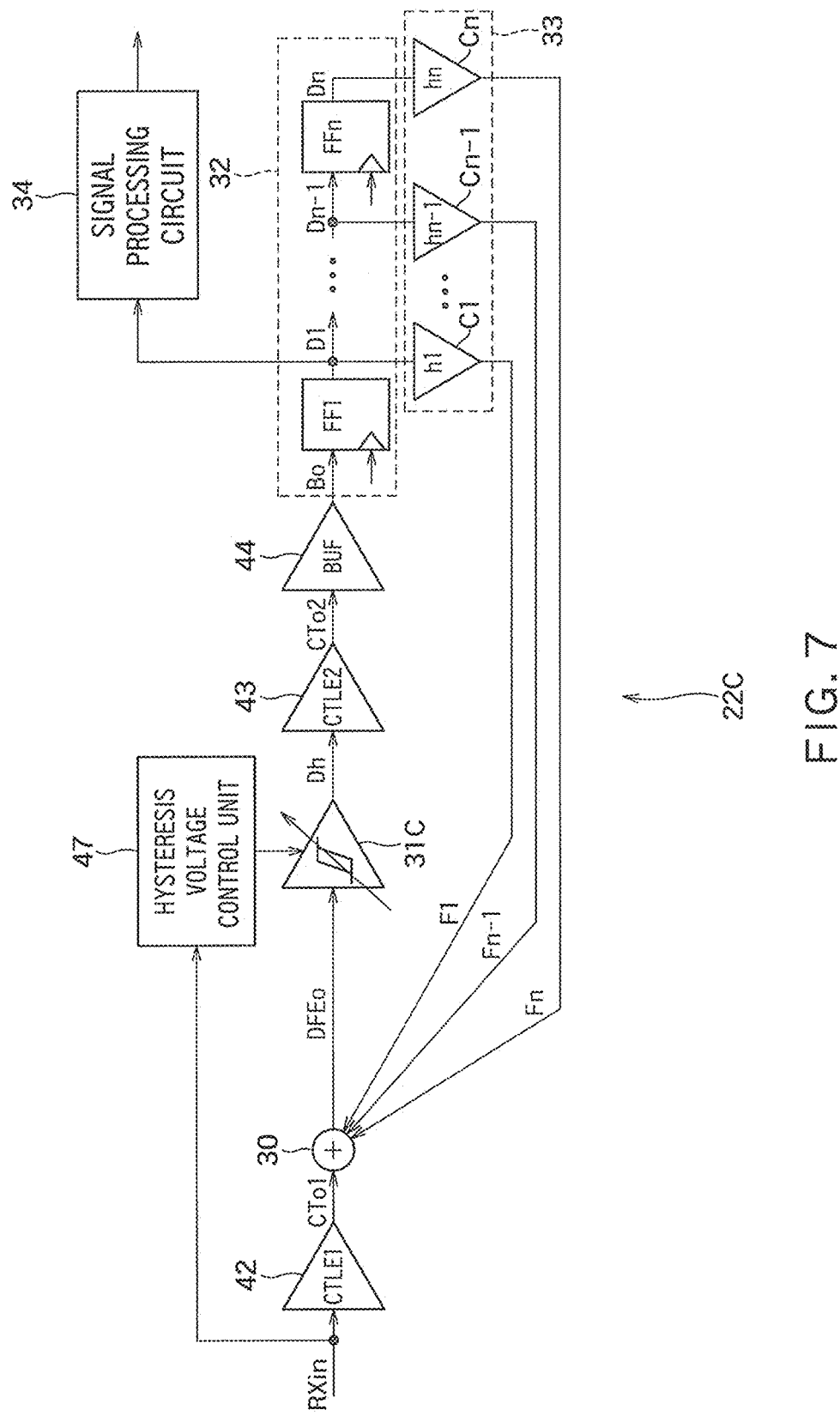
FIG. 7 is a block diagram illustrating a schematic configuration of a reception circuit according to a fourth embodiment.

FIG. 7 is a block diagram illustrating a schematic configuration of a reception circuit 22C according to the fourth embodiment. In FIG. 7, components common to those in FIG. 6 are denoted with the same reference numerals and a difference is mainly described hereinafter.

As compared with the configuration of FIG. 6, the reception circuit 22C does not include a variable gain amplifier 40 and a gain control unit 41 and includes a hysteresis voltage control unit 47. The hysteresis circuit 31C is configured so that a first threshold voltage Vth1 and a second threshold voltage −Vth2 can be controlled. That is, a hysteresis voltage Vhyst, which is a difference between the first threshold voltage Vth1 and the second threshold voltage −Vth2, can be controlled.

The hysteresis voltage control unit 47 controls the hysteresis voltage Vhyst of the hysteresis circuit 31C, according to amplitude of a reception signal RXin. Specifically, the hysteresis voltage control unit 47 increases the hysteresis voltage Vhyst as the amplitude of the reception signal RXin increases. That is, the hysteresis voltage control unit 47 increases absolute values of the first threshold voltage Vth1 and the second threshold voltage −Vth2. In addition, the hysteresis voltage control unit 47 decreases the hysteresis voltage Vhyst as the amplitude of the reception signal RXin decreases. That is, the hysteresis voltage control unit 47 decreases the absolute values of the first threshold voltage Vth1 and the second threshold voltage −Vth2. An upper limit and a lower limit of the hysteresis voltage Vhyst may be set to obtain desired data restoration performance in consideration of a range of the amplitude of the reception signal RXin. However, the lower limit is set to a value more than 0 V.

Figure 8A:
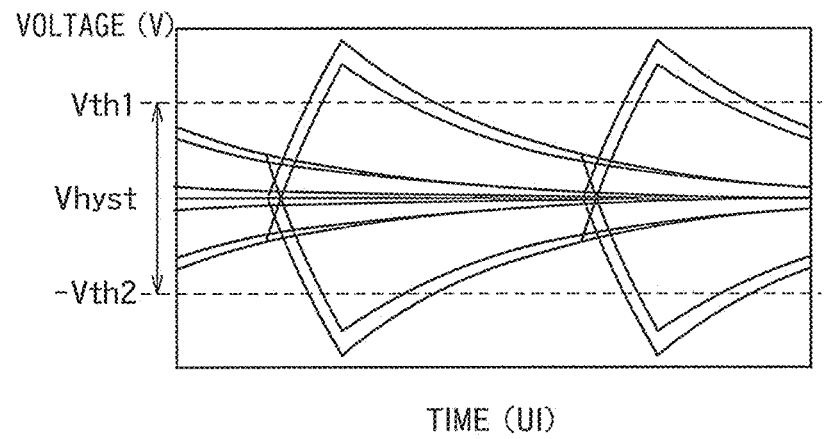
FIG. 8A is a diagram illustrating an eye pattern of a reception signal in the reception circuit of FIG. 7 in the case in which the amplitude of the reception signal is small.
Figure 8B:
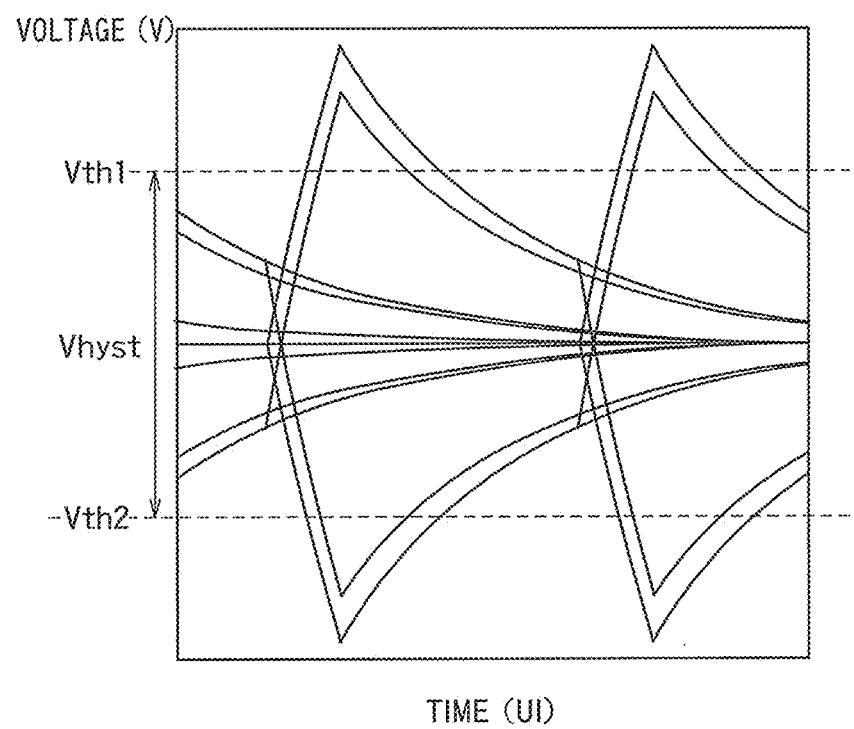
FIG. 8B is a diagram illustrating an eye pattern of the reception signal in the reception circuit of FIG. 7 in the case in which the amplitude of the reception signal is large.

FIG. 8A is a diagram illustrating an eye pattern of the reception signal RXin in the reception circuit 22C of FIG. 7 in the case in which the amplitude of the reception signal RXin is small. FIG. 8B is a diagram illustrating an eye pattern of the reception signal RXin in the reception circuit 22C of FIG. 7 in the case in which the amplitude of the reception signal RXin is large. In FIG. 8B, the hysteresis voltage Vhyst increases as compared with FIG. 8A.

Thereby, according to this embodiment, even though the amplitude of the reception signal RXin changes, data can be accurately restored.

Even in this embodiment, similar to the second or third embodiment, the variable gain amplifier 40 connected between a reception electrode R21 and an adder 30 and the gain control unit 41 may be included. In this case, gain of the variable gain amplifier 40 may be first adjusted and the hysteresis voltage Vhyst of the hysteresis circuit 31C may be adjusted when a variable range of the gain by only the variable gain amplifier 40 is insufficient. Adjustment order of the variable gain amplifier 40 and the hysteresis circuit 31C may be reversed. Thereby, even when the amplitude change of the reception signal RXin is large, the variable gain amplifier 40 and the hysteresis circuit 31C can be more easily designed.

Fifth Embodiment

In a fifth embodiment, loop unrolling technology is applied.

Figure 9:
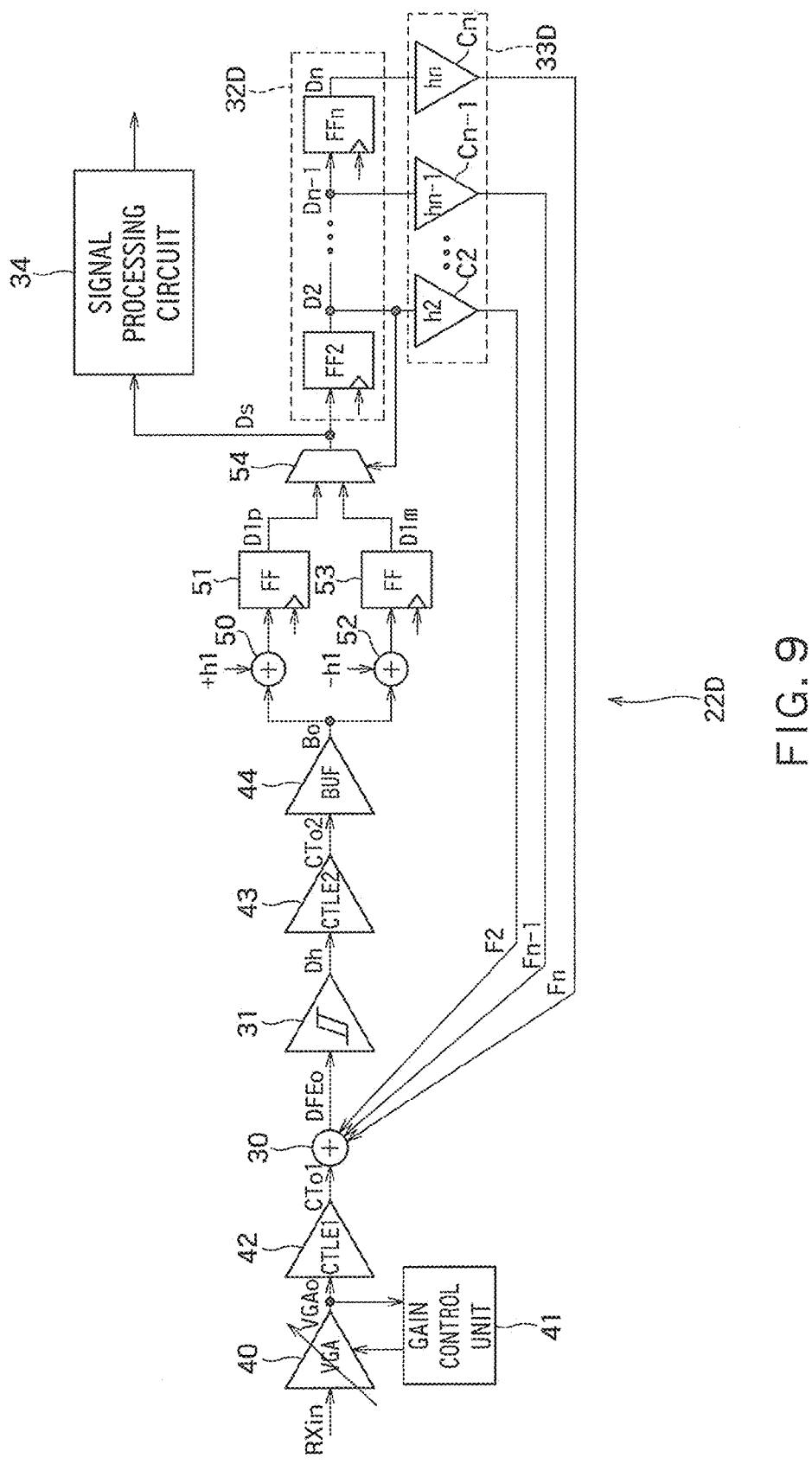
FIG. 9 is a block diagram illustrating a schematic configuration of a reception circuit according to a fifth embodiment.

FIG. 9 is a block diagram illustrating a schematic configuration of a reception circuit 22D according to the fifth embodiment. In FIG. 9, components common to those in FIG. 4 are denoted with the same reference numerals and a difference is mainly described hereinafter.

The reception circuit 22D includes a first coefficient adder 50, a first flip-flop 51, a second coefficient adder 52, a second flip-flop 53, and a selector 54 in addition to the configuration of FIG. 4.

The first coefficient adder 50 adds a tap coefficient (first coefficient) h1 to an output signal Bo of a buffer 44.

The first flip-flop 51 holds output data of the first coefficient adder 50 according to a clock.

The second coefficient adder 52 adds a negative tap coefficient (second coefficient) (−h1) to the output signal Bo of the buffer 44.

The second flip-flop 53 holds output data of the second coefficient adder 52 according to a clock.

A selector 54 selects output data D1p of the first flip-flop 51 or output data D1m of the second flip-flop 53 and outputs the selected output data.

A shift register 32D sequentially shifts output data Ds of the selector 54 and controls selection by the selector 54 by output data D2 shifted once. The shift register 32D has (n−1) flip-flops FF2 to FFn.

A feedback signal generator 33D generates corresponding feedback signals F2 to Fn, according to each output data D2 to Dn of the shift register 32D.

A signal processing circuit 34 executes signal processing using the output data Ds of the selector 54.

According to this embodiment, because the loop unrolling technology is used, a feedback path from immediately previous data to current data can be removed. That is, a feedback path of the feedback signal F1 in the first embodiment can be removed. Thereby, strictest restriction of feedback timing from the immediately previous data to the current data in the first embodiment can be removed. Therefore, it is possible to correspond to a high-speed reception signal RXin.

In addition, the loop unrolling technology can be applied to second and following taps.

Modification of Third to Fifth Embodiments

In the third and fifth embodiments, at least one of the variable gain amplifier 40 and the gain control unit 41, the first continuous time linear equalizer 42, the second continuous time linear equalizer 43, and the buffer 44 may be provided.

In the fourth embodiment, at least one of the first continuous time linear equalizer 42, the second continuous time linear equalizer 43, and the buffer 44 may be provided.

In addition, in the third to fifth embodiments, at least one of the second continuous time linear equalizer 43 and the buffer 44 may be provided between the reception electrode R21 and the adder 30. The circuits provided between the reception electrode R21 and the adder 30 may be connected in any order and the circuits provided between the adder 30 and the shift register 32 may also be connected in any order.

In addition, in the fourth and fifth embodiments, the first continuous time linear equalizer 42 may be provided between the adder 30 and the shift register 32.

That is, the first continuous time linear equalizer 42 is connected between the reception electrode R21 and the adder 30, between the adder 30 and the hysteresis circuit 31, or between the hysteresis circuit 31 and the shift register 32, amplifies a frequency component of a first high frequency band included in a signal transmitted from a circuit of a previous stage, and outputs an obtained signal to a circuit of a rear stage.

In addition, the second continuous time linear equalizer 43 is connected between the reception electrode R21 and the adder 30, between the adder 30 and the hysteresis circuit 31, or between the hysteresis circuit 31 and the shift register 32, attenuates a frequency component of a second high frequency band included in a signal transmitted from a circuit of a previous stage, and outputs an obtained signal to a circuit of a rear stage.

In the fourth embodiment, the first continuous time linear equalizer 42, the second continuous time linear equalizer 43, and the buffer 44 may not be provided.

In addition, in the fifth embodiment, the variable gain amplifier 40, the gain control unit 41, the first continuous time linear equalizer 42, the second continuous time linear equalizer 43, and the buffer 44 may not be provided. In this case, the first coefficient adder 50 adds the tap coefficient h1 to the output data Dh of the hysteresis circuit 31 and the second coefficient adder 52 adds the negative tap coefficient −h1 to the output data Dh of the hysteresis circuit 31.

Sixth Embodiment

A sixth embodiment is different from the first embodiment in that feedback signals F1 to Fn are pulsed.

Figure 10:
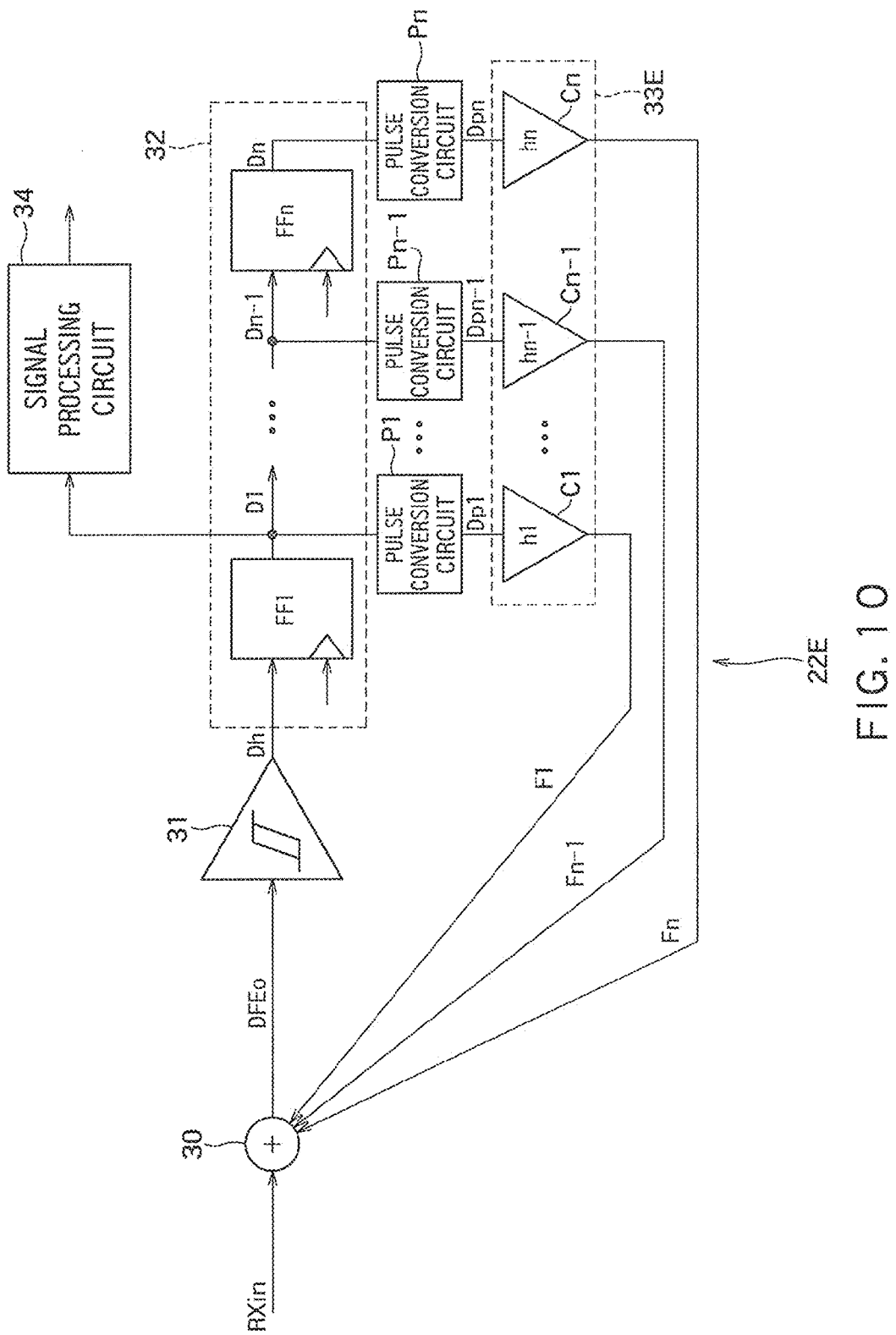
FIG. 10 is a block diagram illustrating a schematic configuration of a reception circuit according to a sixth embodiment.

FIG. 10 is a block diagram illustrating a schematic configuration of a reception circuit 22E according to the sixth embodiment. In FIG. 10, commons common to those in FIG. 1 are denoted with the same reference numerals and a difference is mainly described hereinafter.

The reception circuit 22E includes pulse conversion circuits P1 to Pn in addition to the configuration of FIG. 1. The pulse conversion circuits P1 to Pn convert output data D1 to Dn of a shift register 32 into pulse data Dp1 to Dpn. Pulse data Dpi changes from an initial value by a predetermined time, when output data Di changes. The predetermined time may be 1 UI. However, the present invention is not limited thereto.

A feedback signal generator 33E generates feedback signals F1 to Fn according to pulse data Dp1 to Dpn. That is, after the output data D1 to Dn of the shift register 32 change, the feedback signal generator 33E changes the corresponding feedback signals F1 to Fn from an initial value by a predetermined time and pulses the feedback signals. Here, the initial value is 0 V. However, the present invention is not limited thereto.

Figure 11:
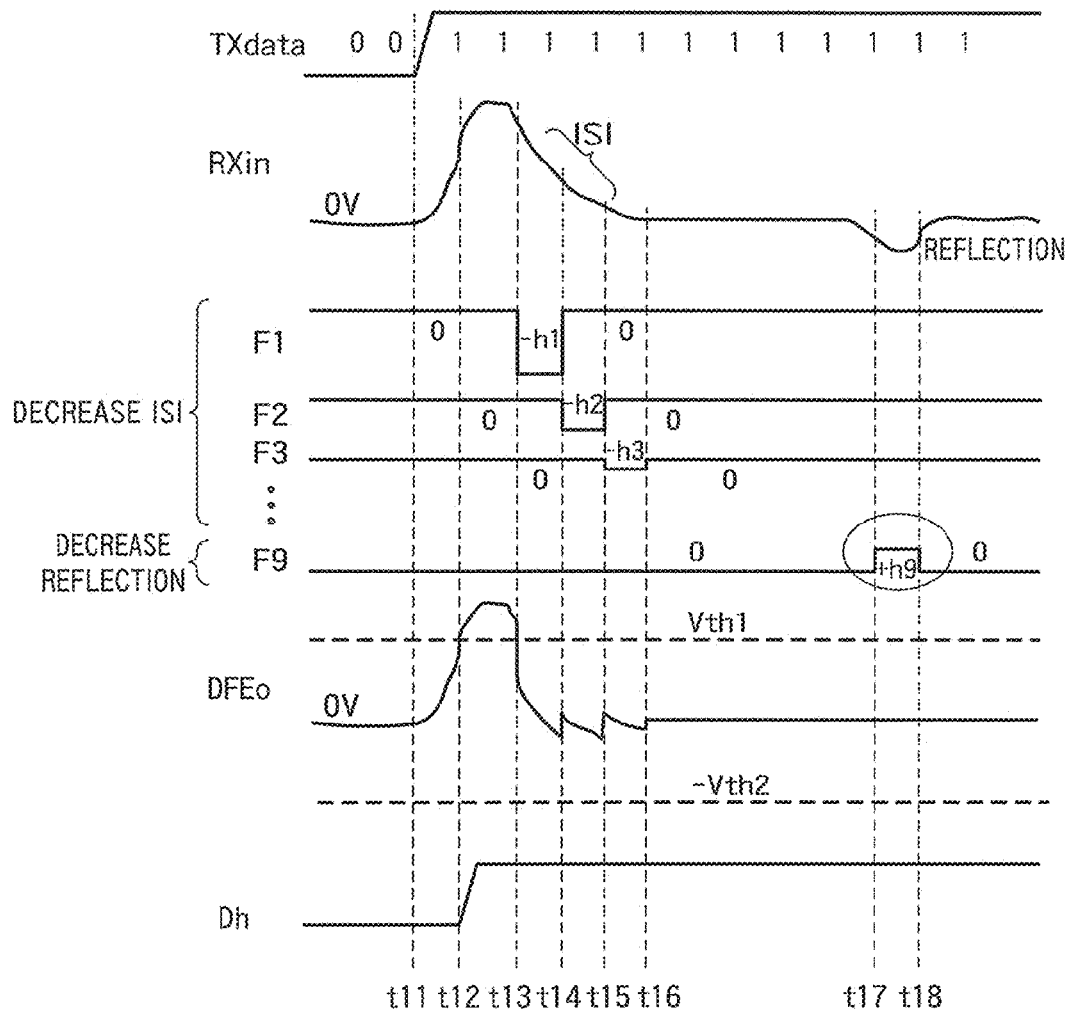
FIG. 11 is a waveform diagram of each unit of the reception circuit of FIG. 10.

FIG. 11 is a waveform diagram of each unit of the reception circuit 22E of FIG. 10. In FIG. 11, n is 9 and transmission data TXdata and a reception signal RXin are the same as those in the waveform diagram of FIG. 3.

Because a voltage of the reception signal RXin is about 0 V to a time t11 and the feedback signals F1 to F9 have the initial value (0 V), a voltage of an output signal DFEo is also about 0 V.

At the time t11, if the transmission data TXdata changes to "1", the voltage of the reception signal RXin increases. Thereby, the voltage of the output signal DFEo also increases and output data Dh changes from "0" to "1" at a time t12.

The shift register 32 sequentially shifts the output data Dh (="1"). Therefore, because the output data D1 changes from "0" to "1" at a next time t13, a value of the feedback signal F1 changes form the initial value 0 to a value −h1. Thereby, a value of the output signal DFEo becomes a value obtained by adding the value −h1 to the reception signal RXin. That is, the value of the output signal DFEo is smaller than a value of the reception signal RXin.

Because the output data D2 changes from "0" to "1" at a next time t14, a value of the feedback signal F2 changes from the initial value 0 to a value −h2. At this time, the value of the feedback signal F1 changes from the value −h1 to the initial value 0. That is, a predetermined time is a time between the time t13 and the time t14. Thereby, the value of the output signal DFEo becomes a value obtained by adding the value −h2 to the reception signal RXin.

Because the output data D3 changes from "0" to "1" at a next time t15, a value of the feedback signal F3 changes from the initial value 0 to a value −h3. At this time, the value of the feedback signal F2 changes from the value −h2 to the initial value 0. Thereby, the value of the output signal DFEo becomes a value obtained by adding a value −h3 to the reception signal RXin.

The same operation is executed at a time t16 and subsequent times. In this way, after the time t13, the inter-symbol interference of the output signal DFEo decreases and the voltage of the output signal approximates 0 V.

In addition, because output data D9 changes from "0" to "1" at a time t17, a value of a feedback signal F9 changes from the initial value 0 to a value +h9. Thereby, the value of the output signal DFEo becomes a value obtained by adding the value +h9 to the reception signal RXin.

A voltage of the reception signal RXin becomes a negative voltage by an influence of reflection, from the time t17 to a time t18. Meanwhile, the influence of the reflection of the output signal DFEo is decreased by the feedback signal F9 and the voltage of the output signal approximates 0 V.

At the next time t18, the value of the feedback signal F9 changes from the value +h9 to the initial value 0. Thereby, the output signal DFEo becomes equal to the reception signal RXin. Therefore, after the time t18, the voltage of the output signal DFEo returns to about 0 V.

Here, in the example illustrated in FIG. 3 corresponding to the first embodiment, after the feedback signal F9 changes to offset the change in the reception signal RXin by the reflection, the change in the feedback signal F9 is offset to make the voltage of the output signal DFEo become 0 V. For this reason, the feedback signal F10 is necessary.

Meanwhile, in this embodiment, the feedback signal F10 is unnecessary. That is, according to this embodiment, because the values of the feedback signals F1 to Fn change from the initial value by the predetermined time, a feedback signal to return a total sum of values of the feedback signals F1 to Fn to the initial value becomes unnecessary. Therefore, the number of steps (the number of taps) of the shift register 32 can be decreased as compared with the first embodiment.

In addition, the same effect as the first embodiment is obtained.

The sixth embodiment may be combined with the second, third, or fourth embodiment.

Seventh Embodiment

A seventh embodiment is different from the first embodiment in that a hysteresis voltage decreases according to a time passage.

Figure 12:
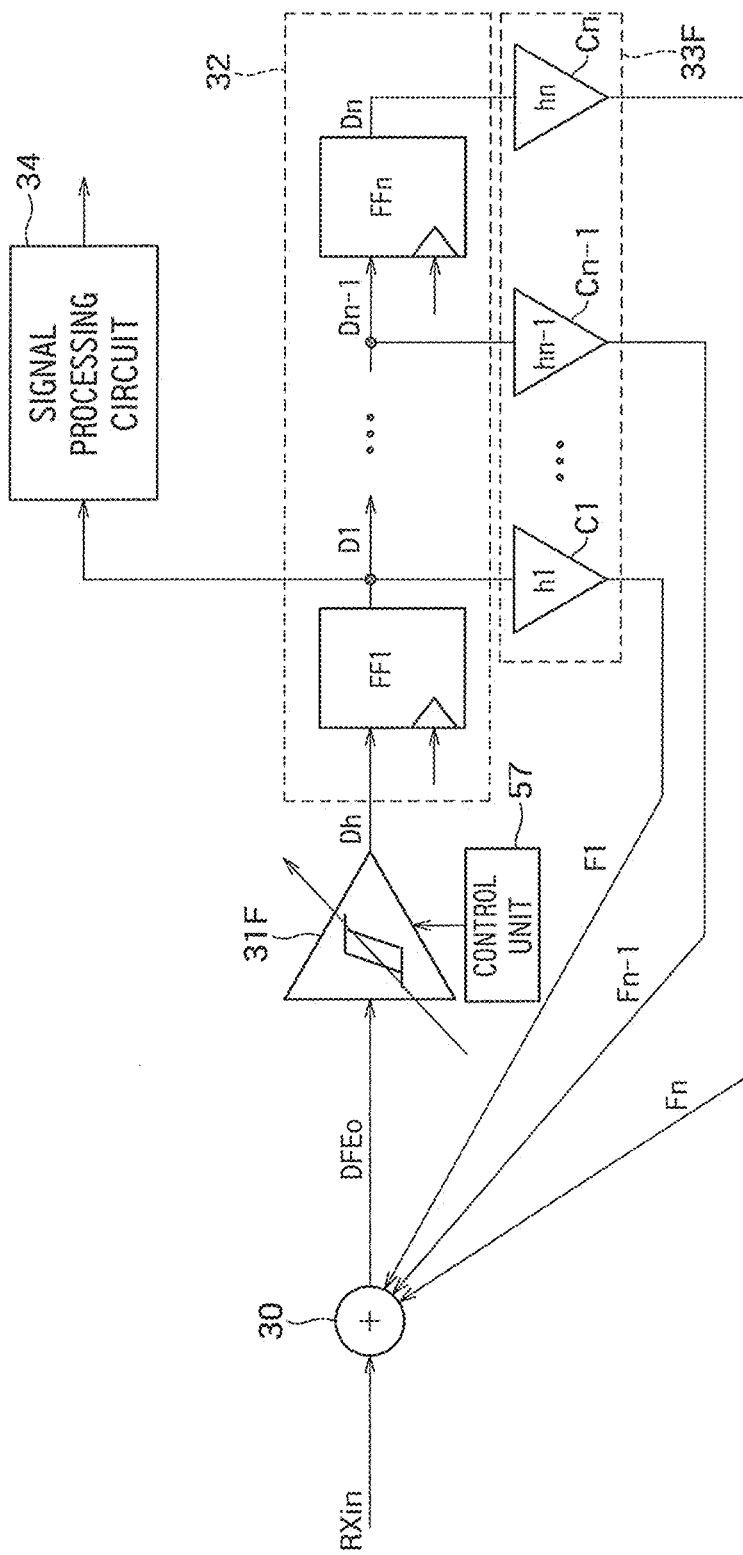
FIG. 12 is a block diagram illustrating a schematic configuration of a reception circuit according to a seventh embodiment.

FIG. 12 is a block diagram illustrating a schematic configuration of a reception circuit 22F according to the seventh embodiment. In FIG. 12, components common to those in FIG. 1 are denoted with the same reference numerals and a difference is mainly described hereinafter.

The reception circuit 22F includes a hysteresis voltage control unit 57 in addition to the configuration of FIG. 1. The hysteresis voltage control unit 57 decreases a hysteresis voltage Vhyst of a hysteresis circuit 31F according to a time passage from an operation start of the reception circuit 22F. The hysteresis circuit 31F functions as a comparator not having hysteresis, when a hysteresis voltage becomes 0 V, that is, "a first threshold voltage Vth1=a second threshold voltage −Vth2=0 V" is satisfied.

Figure 13:
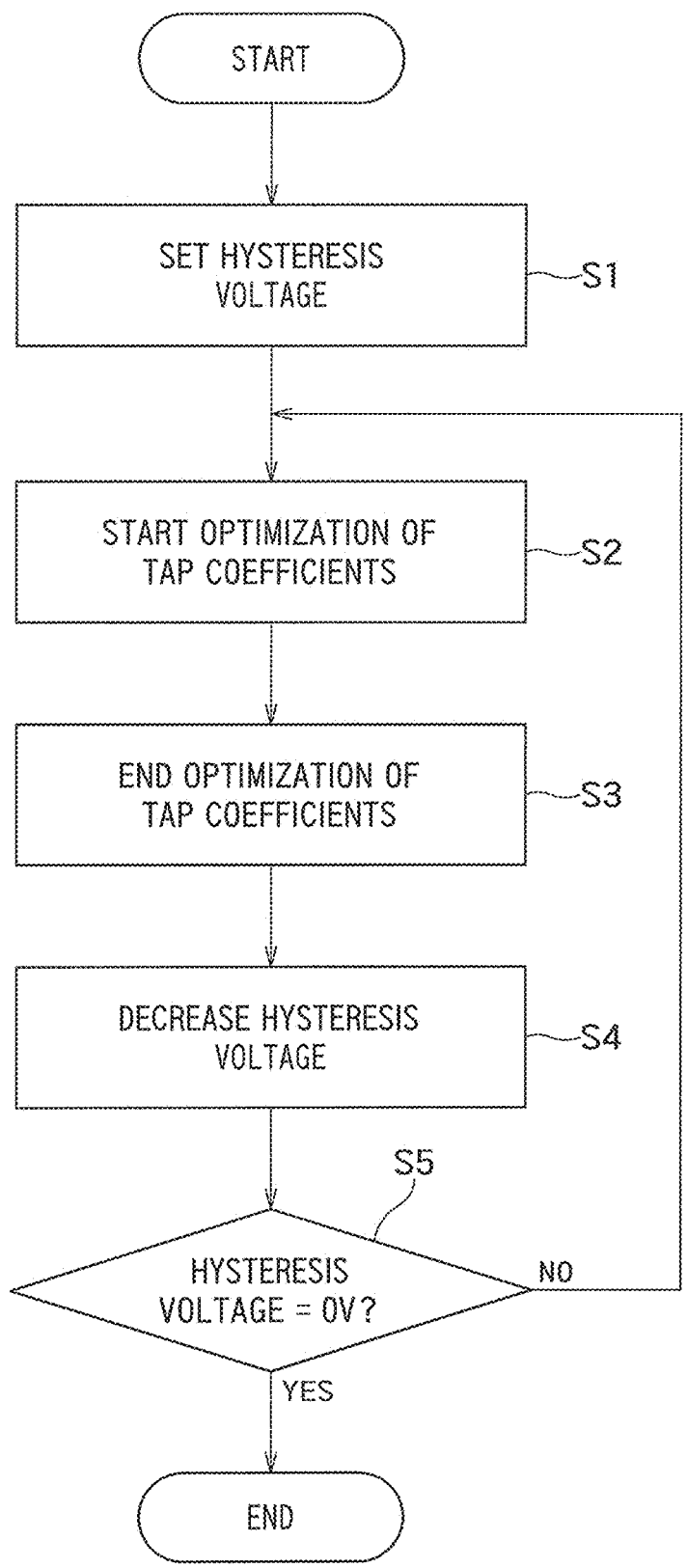
FIG. 13 is a flowchart illustrating optimization processing of the reception circuit of FIG. 12.

FIG. 13 is a flowchart illustrating optimization processing of the reception circuit 22F of FIG. 12.

First, the hysteresis voltage control unit 57 sets the hysteresis voltage Vhyst to an initial value (step S1).

Next, a feedback signal generator 33F starts optimization of tap coefficients h1 to hn (step S2). Here, the tap coefficients h1 to hn may be determined by an LMS algorithm, as described above. Next, the feedback signal generator 33F ends the optimization of the tap coefficients h1 to hn (step S3).

Next, the hysteresis voltage control unit 57 decreases the hysteresis voltage Vhyst (step S4). Next, when the hysteresis voltage Vhyst is 0 V (step S5; Yes), the optimization processing of the tap coefficients h1 to hn and the hysteresis voltage Vhyst ends. Meanwhile, when the hysteresis voltage Vhyst is not 0 V (step S5; No), the process returns to the process of step S2. In step S5, when the hysteresis voltage Vhyst decreases to a predetermined voltage, the optimization processing may end.

Figure 14:
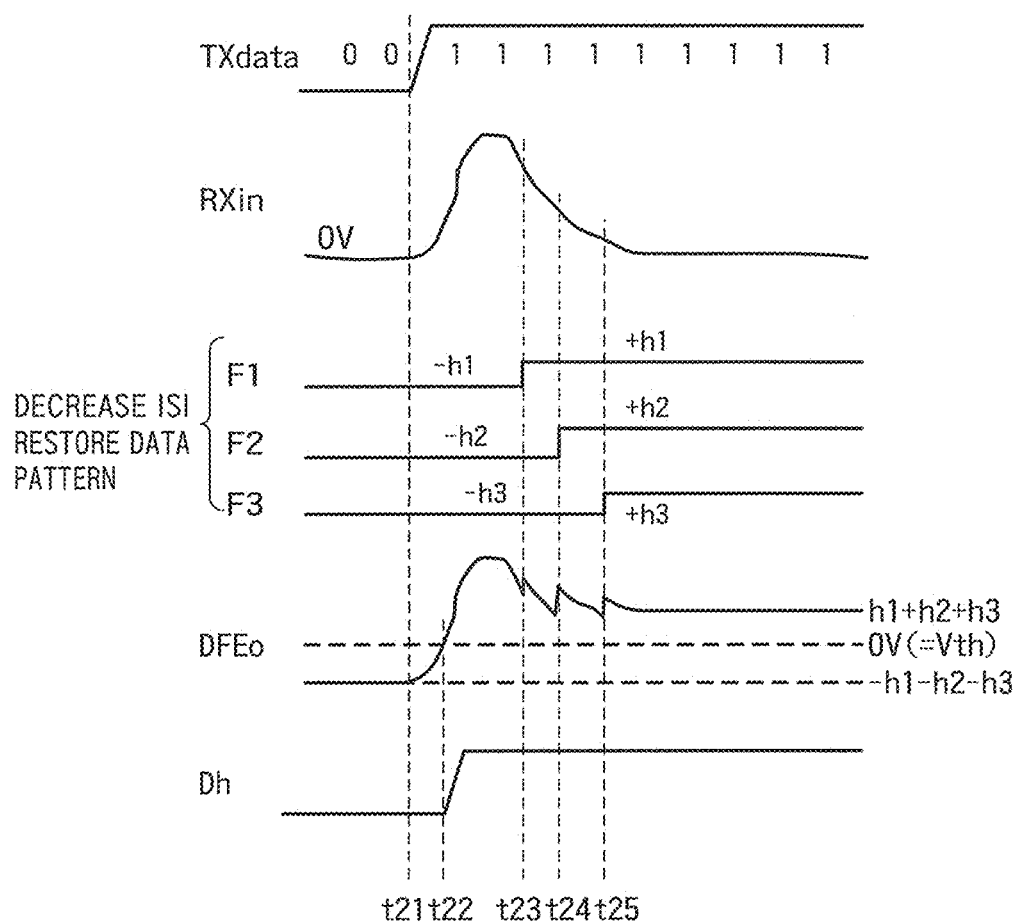
FIG. 14 is a waveform diagram of each unit of the reception circuit of FIG. 12.

FIG. 14 is a waveform diagram of each unit of the reception circuit 22F of FIG. 12. The waveform diagram illustrates a waveform after the optimization processing of FIG. 13 ends and the hysteresis voltage Vhyst becomes 0 V. In FIG. 14, n is 3 and transmission data TXdata is the same as that in the waveform diagram of FIG. 3.

Because a voltage of the reception signal RXin is about 0 V to a time t21, a value of an output signal DFEo is a total sum (=−h1−h2−h3) of values of the feedback signals F1 to F3. That is, a voltage of the output signal DFEo is a negative voltage.

If the transmission data TXdata changes to "1" at the time t21, the voltage of the reception signal RXin increases. Thereby, the voltage of the output signal DFEo also increases and is more than 0 V at a time t22. Therefore, at the time t22, the output data Dh changes from "0" to "1".

The shift register 32 sequentially shifts the output data Dh (="1"). Therefore, because the output data D1 changes from "0" to "1" at a next time t23, a value of the feedback signal F1 changes from a value −h1 to a value +h1. Thereby, the value of the output signal DFEo becomes a value obtained by adding the value h1−h2−h3 to the reception signal RXin.

Because the output data D2 changes from "0" to "1" at a next time t24, a value of the feedback signal F2 changes from a value −h2 to a value +h2. Thereby, the value of the output signal DFEo becomes a value obtained by adding a value h1+h2−h3 to the reception signal RXin.

Because the output data D3 changes from "0" to "1" at a next time t25, a value of the feedback signal F3 changes from a value −h3 to a value +h3. Thereby, the value of the output signal DFEo becomes a value obtained by adding a value h1+h2+h3 to the reception signal RXin. After the time t25, if the voltage of the reception signal RXin becomes about 0 V, the value of the output signal DFEo becomes a value h1+h2+h3.

By such an operation, inter-symbol interference can be decreased.

As such, the tap coefficients h1 to h3 are set so that the voltage of the output signal DFEo becomes a positive voltage (=h1+h2+h3) or a negative voltage (=−h1−h2−h3) in a steady state, after the hysteresis voltage Vhyst becomes 0 V. Thereby, even though the hysteresis voltage Vhyst is 0 V, the possibility of erroneous decision can be decreased.

Here, the hysteresis circuit 31 having the hysteresis in the first embodiment may increase jitter as compared with the comparator not having the hysteresis and a design thereof is difficult.

Meanwhile, according to this embodiment, because the hysteresis voltage Vhyst of the hysteresis circuit 31F decreases according to the time passage from the operation start, the hysteresis voltage Vhyst becomes 0 after some time passes. Therefore, an influence of the jitter by the hysteresis circuit 31F can be decreased.

In addition, the same effect as the first embodiment is obtained.

Similar to the first embodiment, fixed tap coefficients h1 to hn stored in advance may be used. In this case, coefficients in which an optimal characteristic is obtained when the hysteresis voltage Vhyst is 0 V may be used as the tap coefficients h1 to hn.

In addition, the seventh embodiment may be combined with the second, third, or fifth embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A reception circuit that receives a reception signal according to a signal transmitted from a transmission electrode through a reception electrode capacitively coupled to the transmission electrode, comprising:
   an adder configured to add one or more feedback signals to the reception signal;
   a hysteresis circuit having hysteresis characteristics, and configured to output data according to an output signal of the adder;
   a shift register configured to sequentially shift the output data of the hysteresis circuit;
   a feedback signal generator configured to generate the feedback signal according to each output data of the shift register;
   a variable gain amplifier connected between the reception electrode and the adder, the variable gain amplifier being configured to amplify the reception signal with variable gain, and output the amplified reception signal to the adder; and
   a gain control unit configured to control the gain, so that amplitude of the amplified reception signal approximates a constant value.

2. The reception circuit according to claim 1,
   wherein the hysteresis circuit compares an output signal of the adder with a first threshold voltage and a second threshold voltage and outputs the output data according to a comparison result, and
   the reception circuit further comprises a hysteresis voltage control unit configured to control a hysteresis voltage according to amplitude of the reception signal, the hysteresis voltage being a difference between the first threshold voltage and the second threshold voltage.

3. The reception circuit according to claim 2,
   wherein the hysteresis voltage control unit increases the hysteresis voltage as the amplitude of the reception signal increases, and decreases the hysteresis voltage as the amplitude of the reception signal decreases.

4. The reception circuit according to claim 3,
   wherein a lower limit of the hysteresis voltage is more than 0 V.

5. A reception circuit that receives a reception signal according to a signal transmitted from a transmission electrode through a reception electrode capacitively coupled to the transmission electrode, comprising:
- an adder configured to add one or more feedback signals to the reception signal;
- a hysteresis circuit having hysteresis characteristics, and configured to output data according to an output signal of the adder;
- a shift register configured to sequentially shift the output data of the hysteresis circuit; and
- a feedback signal generator configured to generate the feedback signal according to each output data of the shift register,
- wherein, after each output data of the shift register changes, the feedback signal generator changes the corresponding feedback signal from an initial value by a predetermined time and pulses the feedback signal.

6. A reception circuit that receives a reception signal according to a signal transmitted from a transmission electrode through a reception electrode capacitively coupled to the transmission electrode, comprising:
- an adder configured to add one or more feedback signals to the reception signal;
- a hysteresis circuit having hysteresis characteristics, and configured to output data according to an output signal of the adder;
- a shift register configured to sequentially shift the output data of the hysteresis circuit; and
- a feedback signal generator configured to generate the feedback signal according to each output data of the shift register,
- wherein the hysteresis circuit compares an output signal of the adder with a first threshold voltage and a second threshold voltage and outputs the output data according to a comparison result, and
- the reception circuit further comprises a hysteresis voltage control unit configured to decrease a hysteresis voltage according to a time passage, the hysteresis voltage being a difference between the first threshold voltage and the second threshold voltage.

7. The reception circuit according to claim 6,
wherein the hysteresis voltage control unit decreases the hysteresis voltage to 0 V.

8. A reception circuit that receives a reception signal according to a signal transmitted from a transmission electrode through a reception electrode capacitively coupled to the transmission electrode, comprising:
- an adder configured to add one or more feedback signals to the reception signal;
- a hysteresis circuit having hysteresis characteristics, and configured to output data according to an output signal of the adder;
- a shift register configured to sequentially shift the output data of the hysteresis circuit; and
- a feedback signal generator configured to generate the feedback signal according to each output data of the shift register,
- a first continuous time linear equalizer connected between the reception electrode and the adder, between the adder and the hysteresis circuit, or between the hysteresis circuit and the shift register, the first continuous time linear equalizer being configured to amplify a frequency component of a first high frequency band included in a signal transmitted from a circuit of a previous stage and output an obtained signal to a circuit of a rear stage, the frequency component of the first high frequency band being the frequency component according to ISI of the reception signal, the ISI of the reception signal being caused by a low-pass filter characteristic between the reception electrode and the adder.

9. A reception circuit that receives a reception signal according to a signal transmitted from a transmission electrode through a reception electrode capacitively coupled to the transmission electrode, comprising:
- an adder configured to add one or more feedback signals to the reception signal;
- a hysteresis circuit having hysteresis characteristics, and configured to output output data according to an output signal of the adder;
- a shift register configured to sequentially shift the output data of the hysteresis circuit; and
- a feedback signal generator configured to generate the feedback signal according to each output data of the shift register,
- a second continuous time linear equalizer connected between the reception electrode and the adder, between the adder and the hysteresis circuit, or between the hysteresis circuit and the shift register, the second continuous time linear equalizer being configured to attenuate a frequency component of a second high frequency band included in a signal transmitted from a circuit of a previous stage and output an obtained signal to a circuit of a rear stage, the frequency component of the second high frequency band being the frequency component according to ISI of the reception signal, the ISI of the reception signal being caused by a high-pass filter characteristic by capacitive coupling.

10. A reception circuit that receives a reception signal according to a signal transmitted from a transmission electrode through a reception electrode capacitively coupled to the transmission electrode, comprising:
- an adder configured to add one or more feedback signals to the reception signal;
- a hysteresis circuit having hysteresis in input and output characteristics, and configured to output output data according to an output signal of the adder;
- a first coefficient adder configured to add a first coefficient to the output data of the hysteresis circuit;
- a first flip-flop configured to hold output data of the first coefficient adder;
- a second coefficient adder configured to add a negative second coefficient to the output data of the hysteresis circuit;
- a second flip-flop configured to hold output data of the second coefficient adder;
- a selector configured to select output data of the first flip-flop or output data of the second flip-flop, and output the selected output data;
- a shift register configured to sequentially shift the output data of the selector and control selection by the selector by the output data shifted once; and
- a feedback signal generator configured to generate the feedback signal, according to each output data of the shift register.

11. The reception circuit according to claim 10, further comprising:
- a variable gain amplifier connected between the reception electrode and the adder, the variable gain amplifier being configured to amplify the reception signal with variable gain, and output the amplified reception signal to the adder; and
- a gain control unit configured to control the gain, so that amplitude of the amplified reception signal approximates a constant value.

12. The reception circuit according to claim 10,
wherein the hysteresis circuit compares an output signal of the adder with a first threshold voltage and a second threshold voltage and outputs the output data according to a comparison result, and
the reception circuit further comprises a hysteresis voltage control unit configured to control a hysteresis voltage according to amplitude of the reception signal, the hysteresis voltage being a difference between the first threshold voltage and the second threshold voltage.

13. The reception circuit according to claim 12,
wherein the hysteresis voltage control unit increases the hysteresis voltage as the amplitude of the reception signal increases, and decreases the hysteresis voltage as the amplitude of the reception signal decreases.

14. The reception circuit according to claim 13,
wherein a lower limit of the hysteresis voltage is more than 0 V.

15. The reception circuit according to claim 10,
wherein the hysteresis circuit compares an output signal of the adder with a first threshold voltage and a second threshold voltage and outputs the output data according to a comparison result, and
the reception circuit further comprises a hysteresis voltage control unit configured to decrease a hysteresis voltage according to a time passage, the hysteresis voltage being a difference between the first threshold voltage and the second threshold voltage.

16. The reception circuit according to claim 10, further comprising:
a first continuous time linear equalizer connected between the reception electrode and the adder, between the adder and the hysteresis circuit, or between the hysteresis circuit and the shift register, the first continuous time linear equalizer being configured to amplify a frequency component of a first high frequency band included in a signal transmitted from a circuit of a previous stage and output an obtained signal to a circuit of a rear stage, the frequency component of the first high frequency band being the frequency component according to ISI of the reception signal, the ISI of the reception signal being caused by a low-pass filter characteristic between the reception electrode and the adder.

17. The reception circuit according to claim 10, further comprising:
a second continuous time linear equalizer connected between the reception electrode and the adder, between the adder and the hysteresis circuit, or between the hysteresis circuit and the shift register, the second continuous time linear equalizer being configured to attenuate a frequency component of a second high frequency band included in a signal transmitted from a circuit of a previous stage and output an obtained signal to a circuit of a rear stage, the frequency component of the second high frequency band being the frequency component according to ISI of the reception signal, the ISI of the reception signal being caused by a high-pass filter characteristic by capacitive coupling.

18. A communication system comprising:
a transmission circuit configured to transmit a signal from a transmission electrode; and
a reception circuit configured to receive a reception signal according to the transmitted signal through a reception electrode capacitively coupled to the transmission electrode,
wherein the reception circuit comprises an adder configured to add one or more feedback signals to the reception signal,
a hysteresis circuit having hysteresis characteristics, and configured to output output data according to an output signal of the adder,
a shift register configured to sequentially shift the output data of the hysteresis circuit;
a feedback signal generator configured to generate the feedback signal according to each output data of the shift register,
wherein the reception circuit comprises,
a variable gain amplifier connected between the reception electrode and the adder, the variable gain amplifier being configured to amplify the reception signal with variable gain, and output the amplified reception signal to the adder, and
a gain control unit configured to control the gain, so that amplitude of the amplified reception signal approximates a constant value.

* * * * *